(12) United States Patent
Nakahara et al.

(10) Patent No.: US 11,448,862 B2
(45) Date of Patent: Sep. 20, 2022

(54) ZOOM LENS AND IMAGING APPARATUS INCLUDING THE SAME

(71) Applicant: CANON KABUSHIKI KAISHA, Tokyo (JP)

(72) Inventors: Makoto Nakahara, Utsunomiya (JP); Shunji Iwamoto, Utsunomiya (JP); Masato Katayose, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/028,525

(22) Filed: Sep. 22, 2020

(65) Prior Publication Data

US 2021/0096342 A1 Apr. 1, 2021

(30) Foreign Application Priority Data

Sep. 30, 2019 (JP) .............................. JP2019-180371

(51) Int. Cl.
*G02B 15/14* (2006.01)
(52) U.S. Cl.
CPC ................................ *G02B 15/1451* (2019.08)
(58) Field of Classification Search
CPC .................................................. G02B 15/1461
See application file for complete search history.

(56) References Cited

U.S. PATENT DOCUMENTS

| | | | | |
|---|---|---|---|---|
| 10,459,207 B2* | 10/2019 | Ito | .................. | G02B 27/0018 |
| 2014/0204462 A1* | 7/2014 | Matsumoto | ........ | G02B 27/4205 |
| | | | | 359/558 |
| 2017/0003486 A1 | 1/2017 | Inoue | | |
| 2018/0210178 A1 | 7/2018 | Saito | | |
| 2018/0284407 A1* | 10/2018 | Iwasawa | ............ | G02B 27/0025 |
| 2019/0025560 A1 | 1/2019 | Okuoka | | |
| 2020/0158998 A1* | 5/2020 | Tanaka | ..................... | G02B 9/64 |

FOREIGN PATENT DOCUMENTS

| | | |
|---|---|---|
| CN | 108535850 A | 9/2018 |
| CN | 108983404 A | 12/2018 |
| JP | 2014-228734 A | 12/2014 |
| JP | 2015-227979 A | 12/2015 |
| JP | 2017-120382 A | 7/2017 |
| JP | 2018116210 A | 7/2018 |
| JP | 2019-158961 A | 9/2019 |

* cited by examiner

*Primary Examiner* — Darryl J Collins
(74) *Attorney, Agent, or Firm* — Canon U.S.A., Inc. IP Division

(57) ABSTRACT

A zoom lens L0 includes a first lens unit L1 having a positive refractive power, a second lens unit L2 having a negative refractive power, a third lens unit L3 having a positive refractive power, an intermediate lens group LM including a plurality of lens units, and a last lens unit LR having a negative refractive power. An interval between the adjacent lens units changes during zooming. The zoom lens L0 includes an aperture stop SP. The intermediate lens group LM includes a negative lens unit LN having a negative refractive power. Both the negative lens unit LN and the last lens unit LR move to an object side during zooming from a wide-angle end to a telephoto end. The zoom lens L0 satisfies predetermined conditional inequalities.

23 Claims, 13 Drawing Sheets

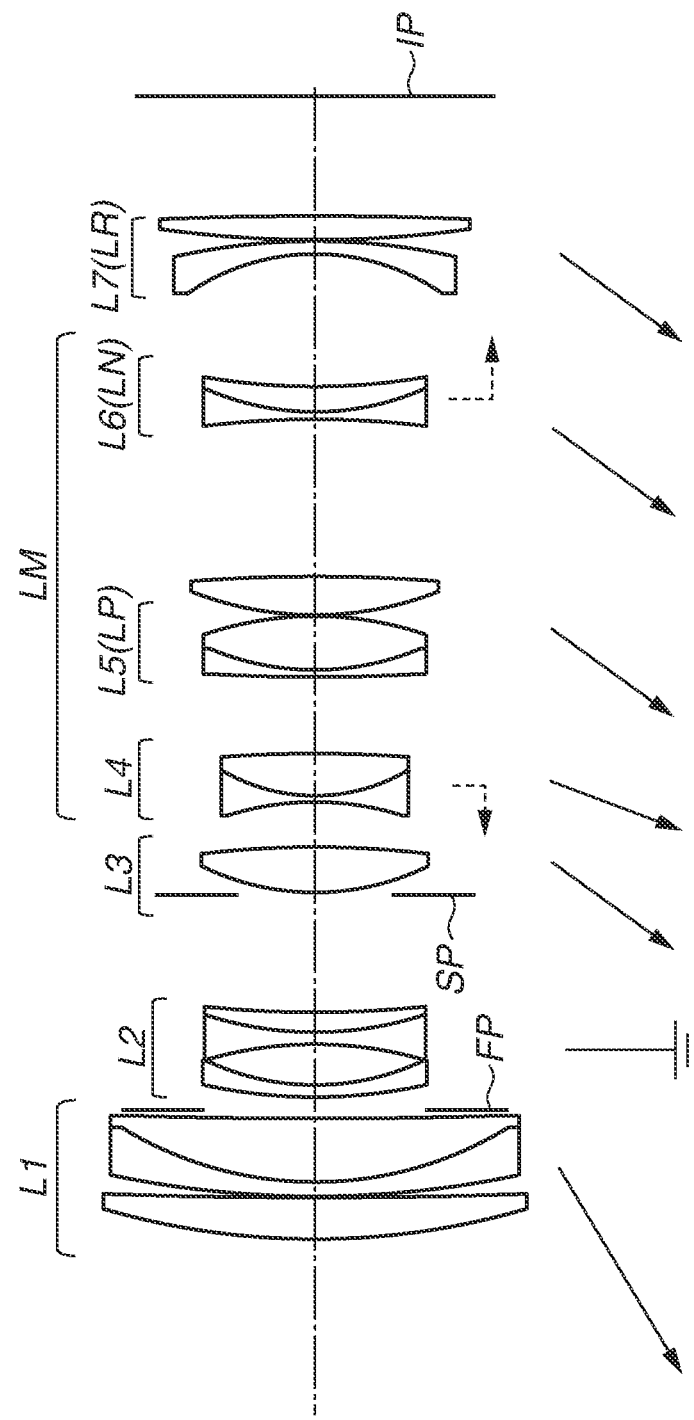

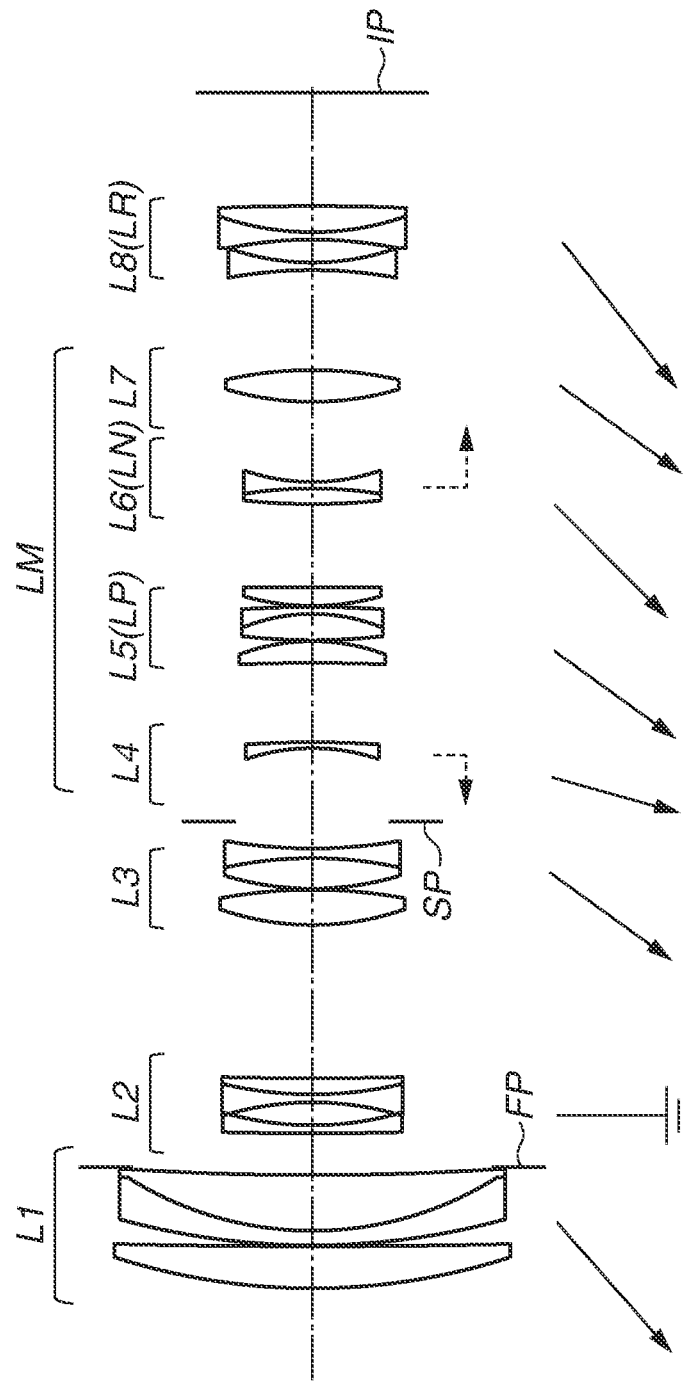

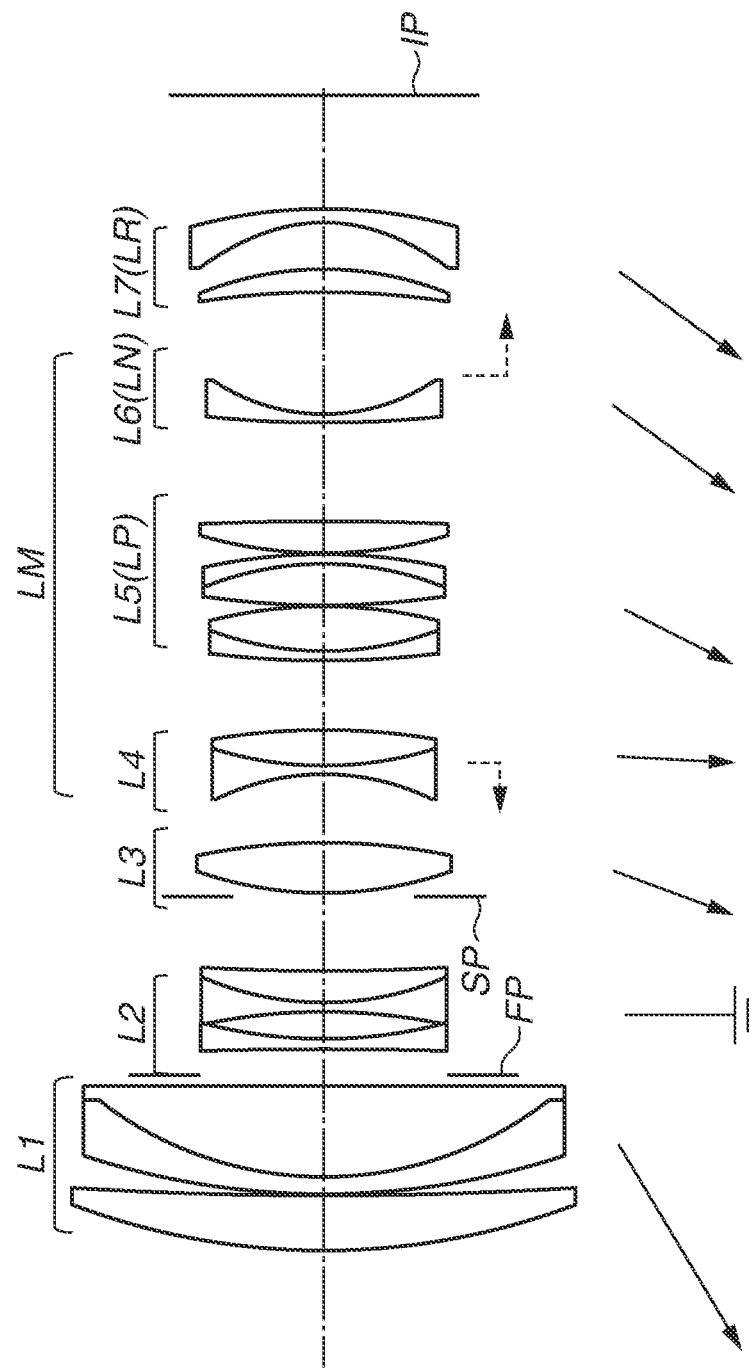

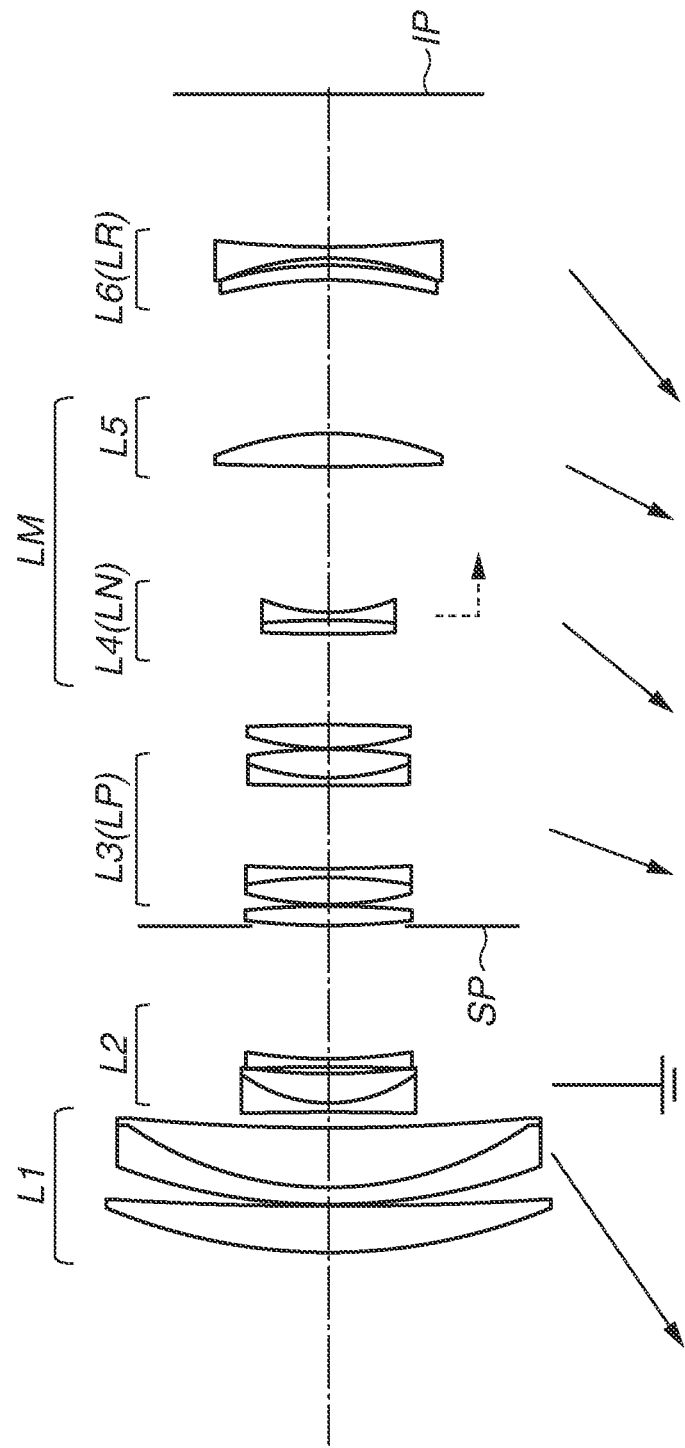

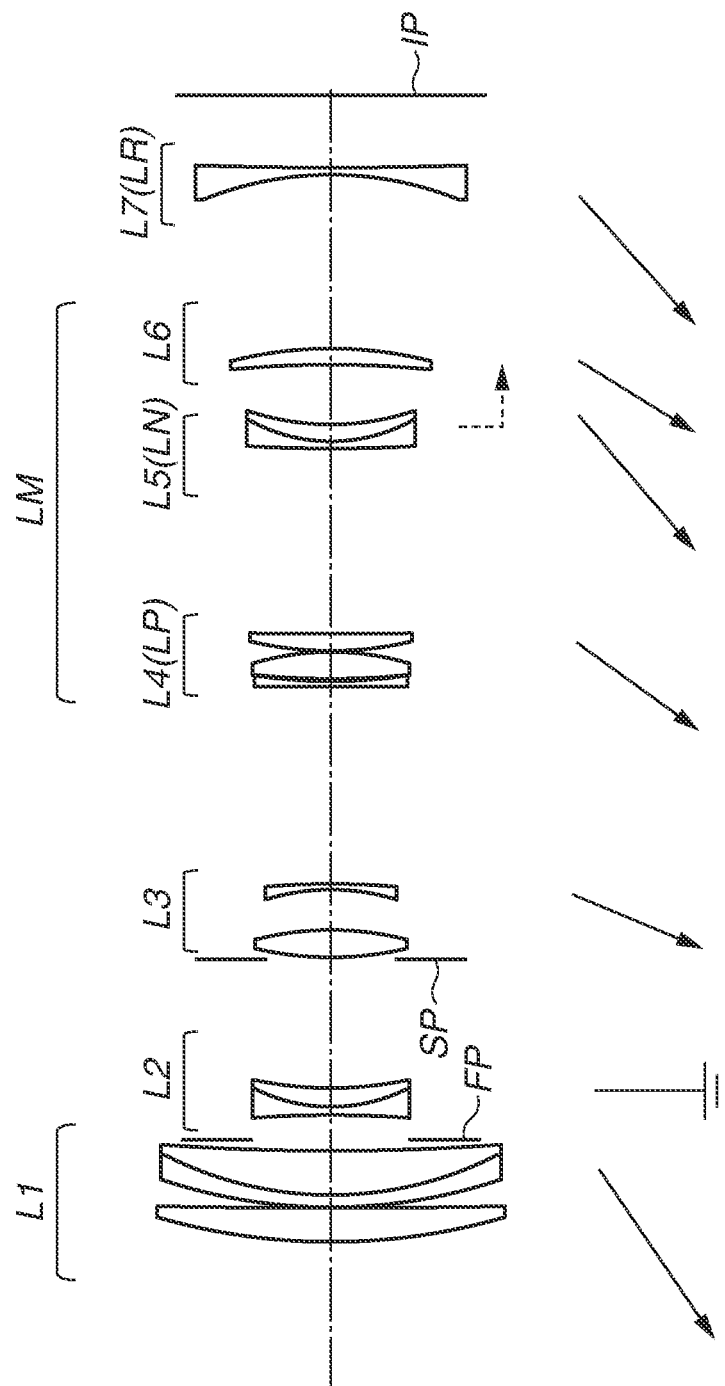

ZOOM LENS AND IMAGING APPARATUS INCLUDING THE SAME

BACKGROUND OF THE DISCLOSURE

Field of the Disclosure

The aspect of the embodiments relates to a zoom lens, and is effectively applicable to a digital video camera, a digital still camera, a broadcast camera, a silver-halide film camera, a monitoring camera, and the like.

Description of the Related Art

In recent years, there has been a demand for a zoom lens to be used in an image pickup apparatus to be short in total lens length yet advanced in optical performance in a wide zoom range.

This demand has been met by, so-called, positive lead-type zoom lens having a positive refractive power at a position closest to the object. (U.S. Patent Application Publication No. 2018/0210178).

U.S. Patent Application Publication No. 2018/0210178 discusses a positive lead-type zoom lens in which lens units are arranged in such a manner that the lens units have positive, negative, positive, negative, positive, and negative refractive powers in order from the object side to the image side.

Generally, the positive lead-type zoom lens is suitable to acquire a high magnification ratio while compactly configuring an entire system. Further, it is possible to construct the positive lead-type zoom lens in a, so-called, telephoto-type power arrangement to make it further advantageous for size reduction by disposing a plurality of lens units, each having a negative refractive power, at positions relatively close to an image plane.

On the other hand, disposing the plurality of lens units each having a negative refractive power on the image plane side can make it difficult to correct a spherical aberration or an axial chromatic aberration.

Further, an increase in the number of negative lens units causes the Petzval sum to tend to have a large negative value, thereby making it difficult to excellently correct a curvature of field.

The zoom lens discussed in U.S. Patent Application Publication No. 2018/0210178 cannot be said to be sufficient in light of these issues, and it is required to find a better configuration with regard to the power arrangement and a movement amount of each lens unit at the time of magnification.

SUMMARY OF THE DISCLOSURE

According to an aspect of the embodiments, a zoom lens includes in order from an object side to an image side: a first lens unit having a positive refractive power; a second lens unit having a negative refractive power; a third lens unit having a positive refractive power; an intermediate lens group including a plurality of lens units; and a last lens unit having a negative refractive power, in which the zoom lens includes an aperture stop, in which an interval between the lens units adjacent to each other changes during zooming, in which the intermediate lens group includes a negative lens unit having a negative refractive power, in which both the negative lens unit and the last lens unit move to the object side during zooming from a wide-angle end to a telephoto end, and in which the following conditional inequalities are satisfied:

$0.10 < fLN/f2 < 1.20$,
$0.25 < ML3/MLN < 0.70$, and
$0.45 < DSPw/TDw < 0.95$, where fLN is a focal length of the negative lens unit, f2 is a focal length of the second lens unit, ML3 is a movement amount of the third lens unit during zooming from the wide-angle end to the telephoto end when focused at infinity, MLN is a movement amount of the negative lens unit during zooming from the wide-angle end to the telephoto end when focused at infinity, DSPw is a distance on an optical axis from the aperture stop to a lens surface of the zoom lens located closest to the image at the wide-angle end, and TDw is a distance on the optical axis from a lens surface of the zoom lens located closest to the object to the lens surface of the zoom lens located closest to the image side at the wide-angle end.

Further features of the disclosure will become apparent from the following description of exemplary embodiments with reference to the attached drawings.

BRIEF DESCRIPTION OF THE DRAWINGS

FIG. 1 is a cross-sectional view of a zoom lens according to a first embodiment.

FIG. 3 is a cross-sectional view of a zoom lens according to a second embodiment.

FIG. 5 is a cross-sectional view of a zoom lens according to a third embodiment.

FIG. 7 is a cross-sectional view of a zoom lens according to a fourth embodiment.

FIG. 11 is a cross-sectional view of a zoom lens according to a sixth embodiment.

DESCRIPTION OF THE EMBODIMENTS

Figure 2A:
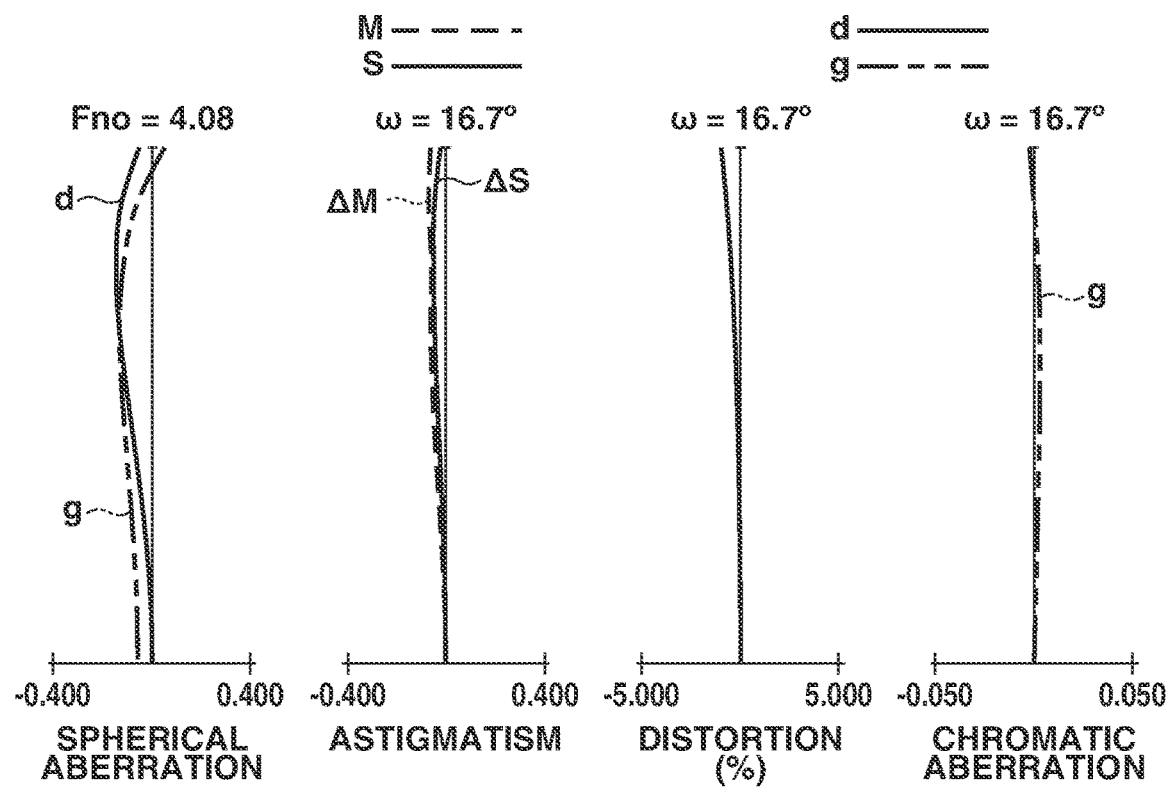
FIG. 2A is an aberration diagram of the zoom lens according to the first embodiment in a state focused at infinity at a wide-angle end.
Figure 2B:
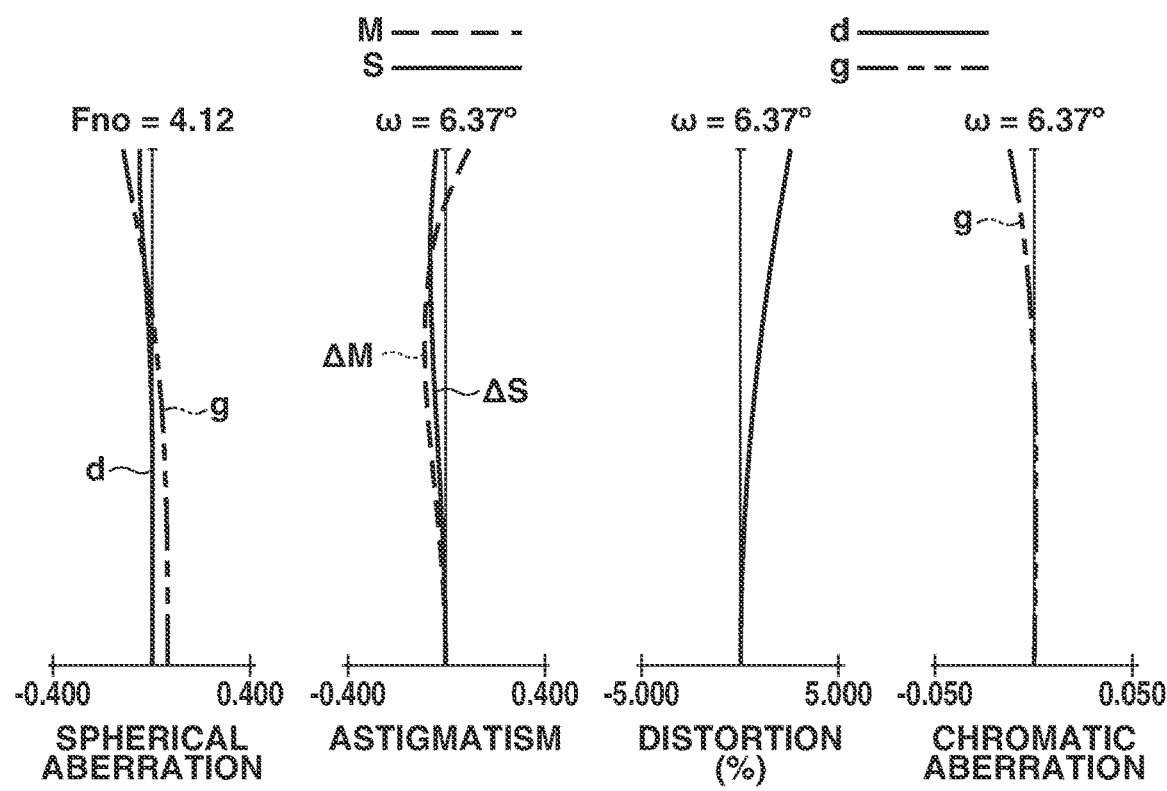
FIG. 2B is an aberration diagram of the zoom lens according to the first embodiment in a state focused at infinity at a telephoto end.
Figure 4A:
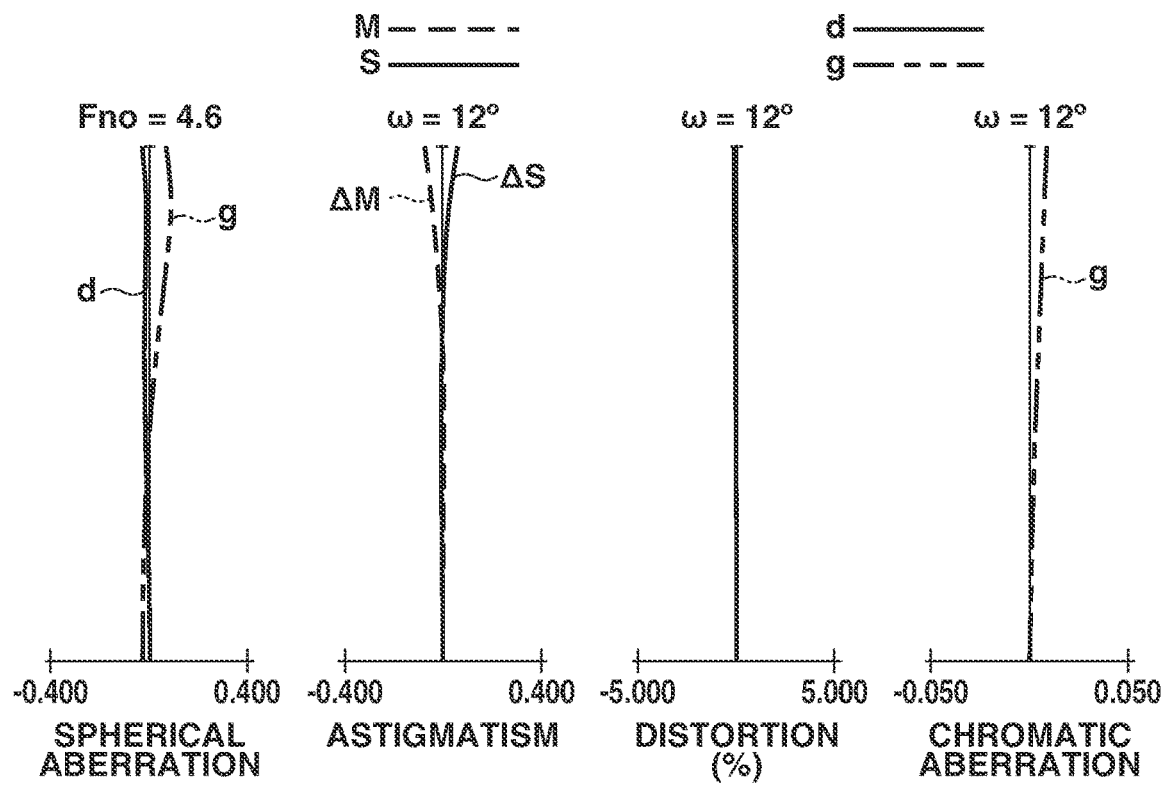
FIG. 4A is an aberration diagram of the zoom lens according to the second embodiment in the state focused at infinity at the wide-angle end.
Figure 4B:
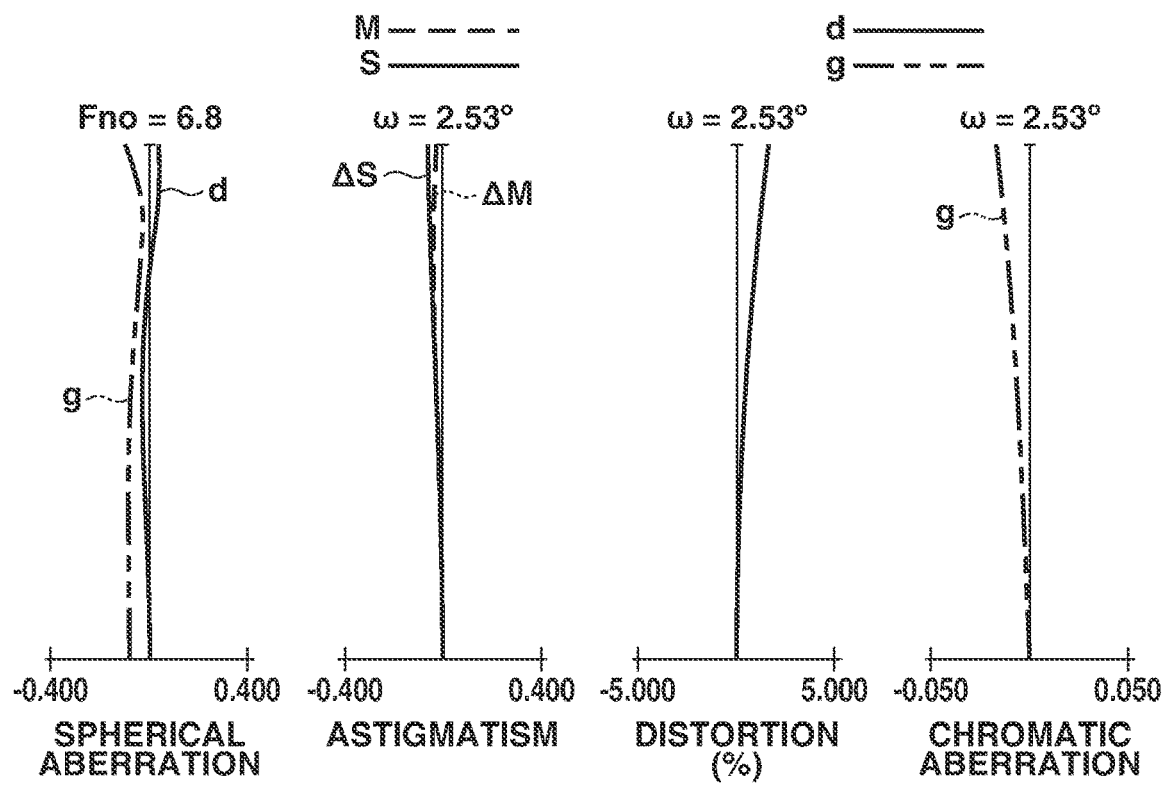
FIG. 4B is an aberration diagram of the zoom lens according to the second embodiment in the state focused at infinity at the telephoto end.
Figure 6A:
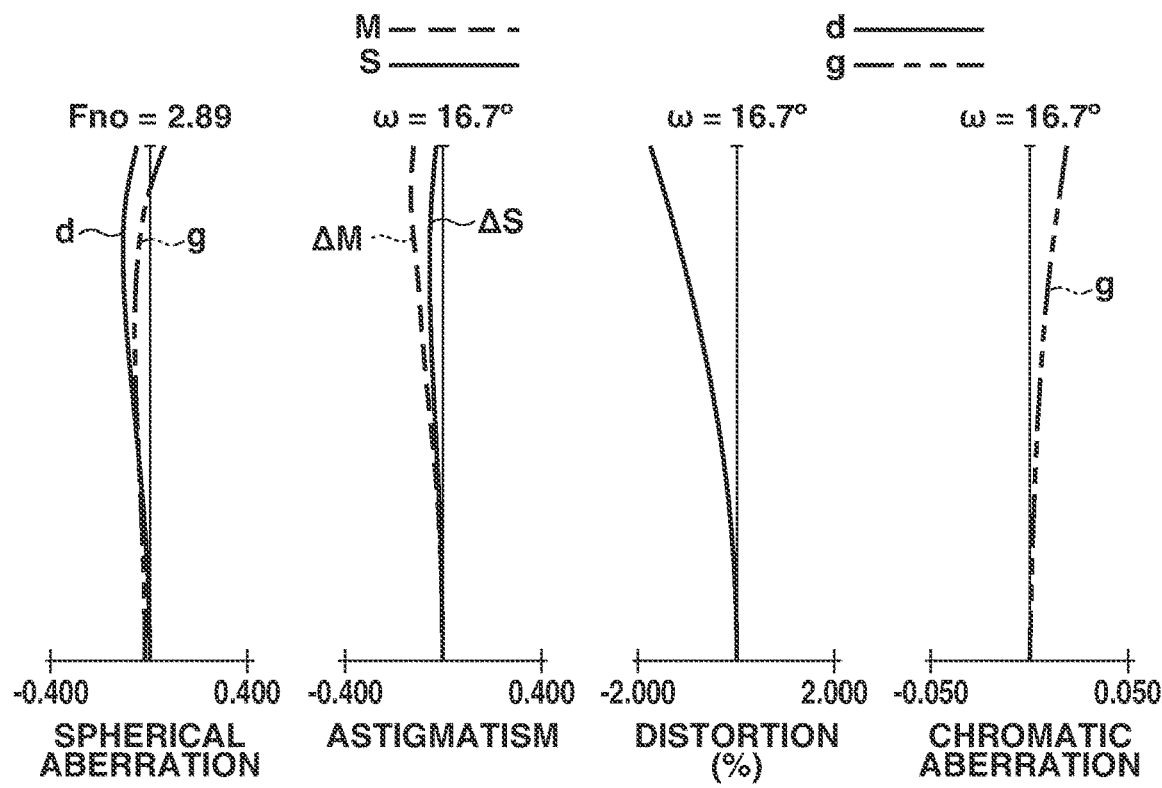
FIG. 6A is an aberration diagram of the zoom lens according to the third embodiment in the state focused at infinity at the wide-angle end.
Figure 6B:
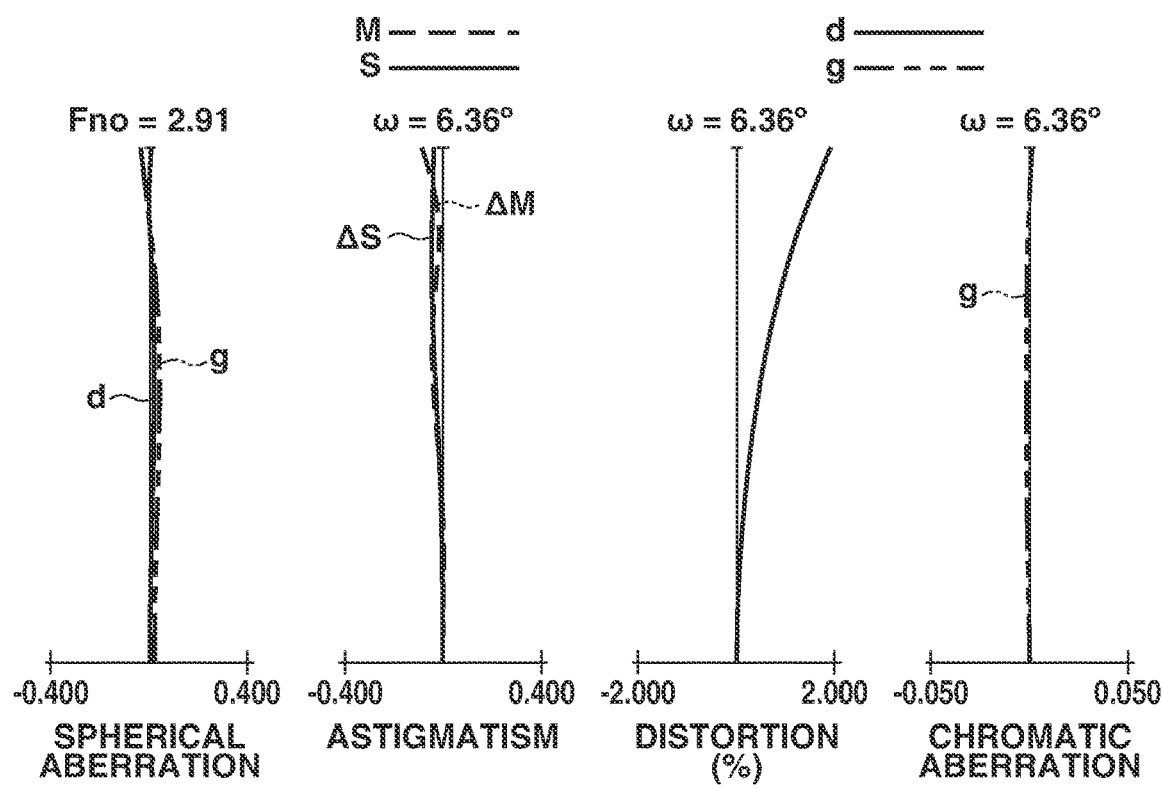
FIG. 6B is an aberration diagram of the zoom lens according to the third embodiment in the state focused at infinity at the telephoto end.
Figure 8A:
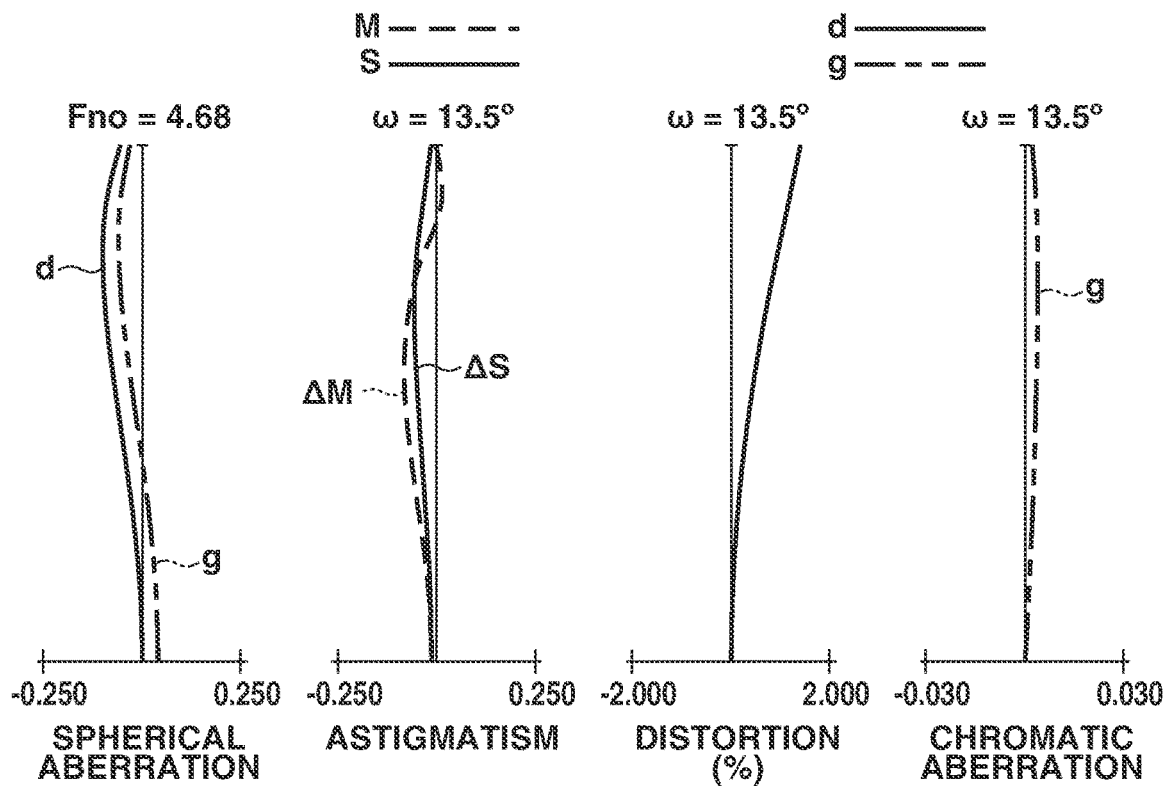
FIG. 8A is an aberration diagram of the zoom lens according to the fourth embodiment in the state focused at infinity at the wide-angle end.
Figure 8B:
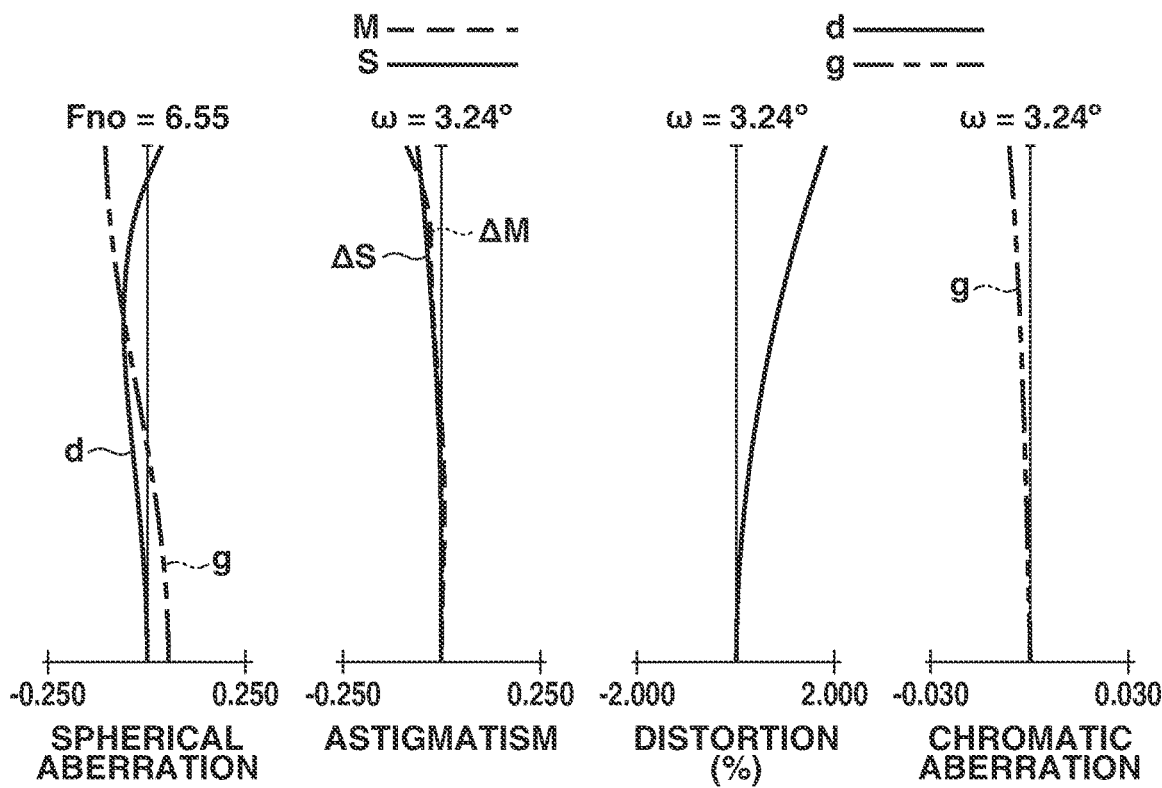
FIG. 8B is an aberration diagram of the zoom lens according to the fourth embodiment in the state focused at infinity at the telephoto end.
Figure 9:
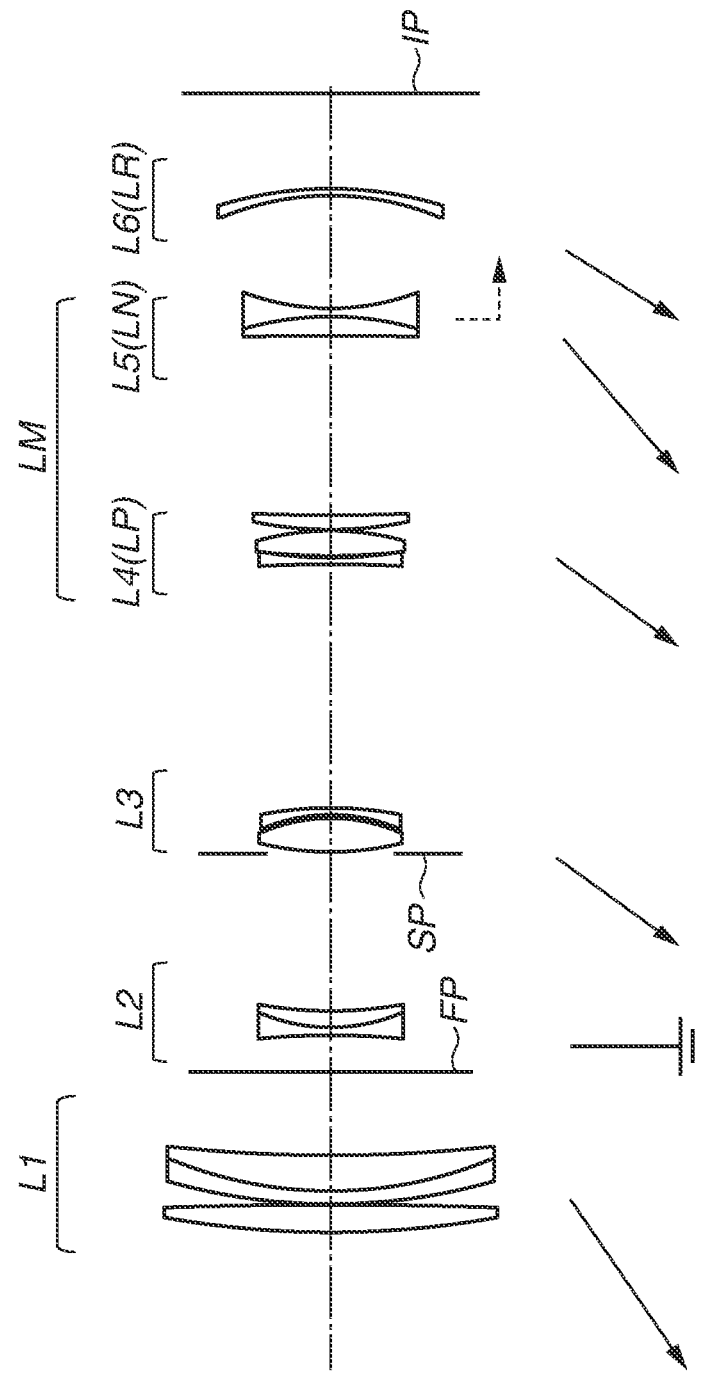
FIG. 9 is a cross-sectional view of a zoom lens according to a fifth embodiment.
Figure 10A:
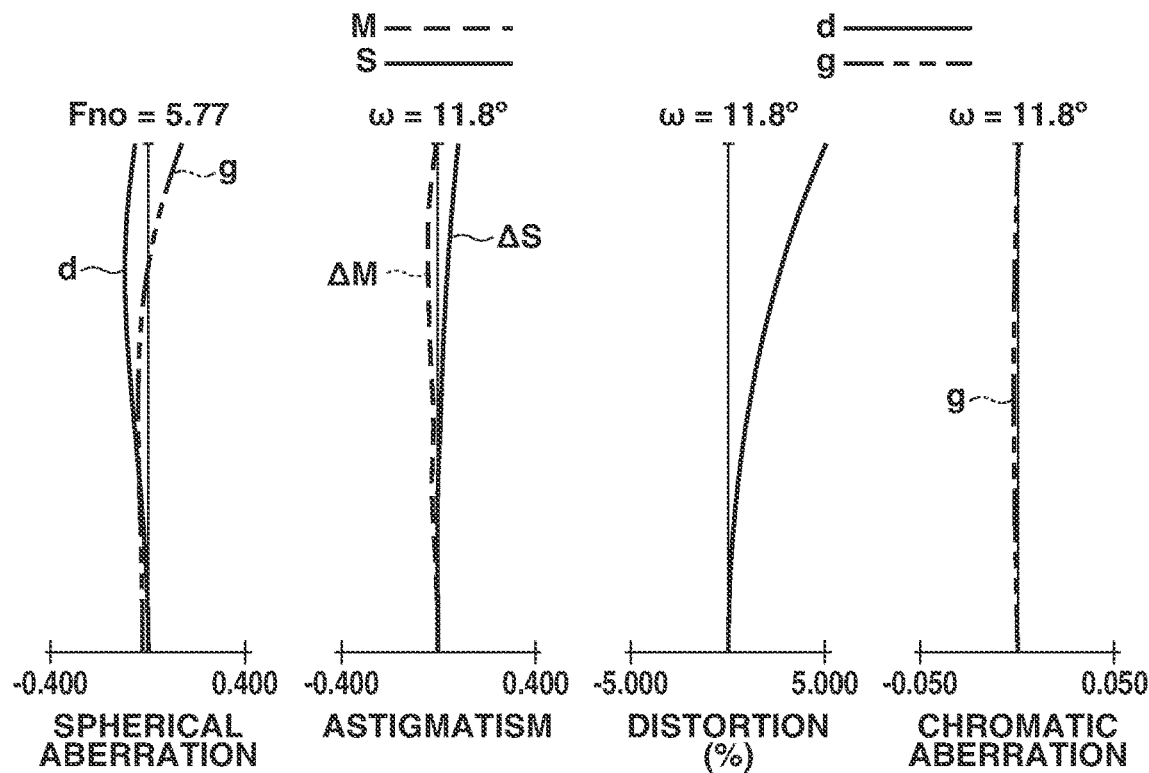
FIG. 10A is an aberration diagram of the zoom lens according to the fifth embodiment in the state focused at infinity at the wide-angle end.
Figure 10B:
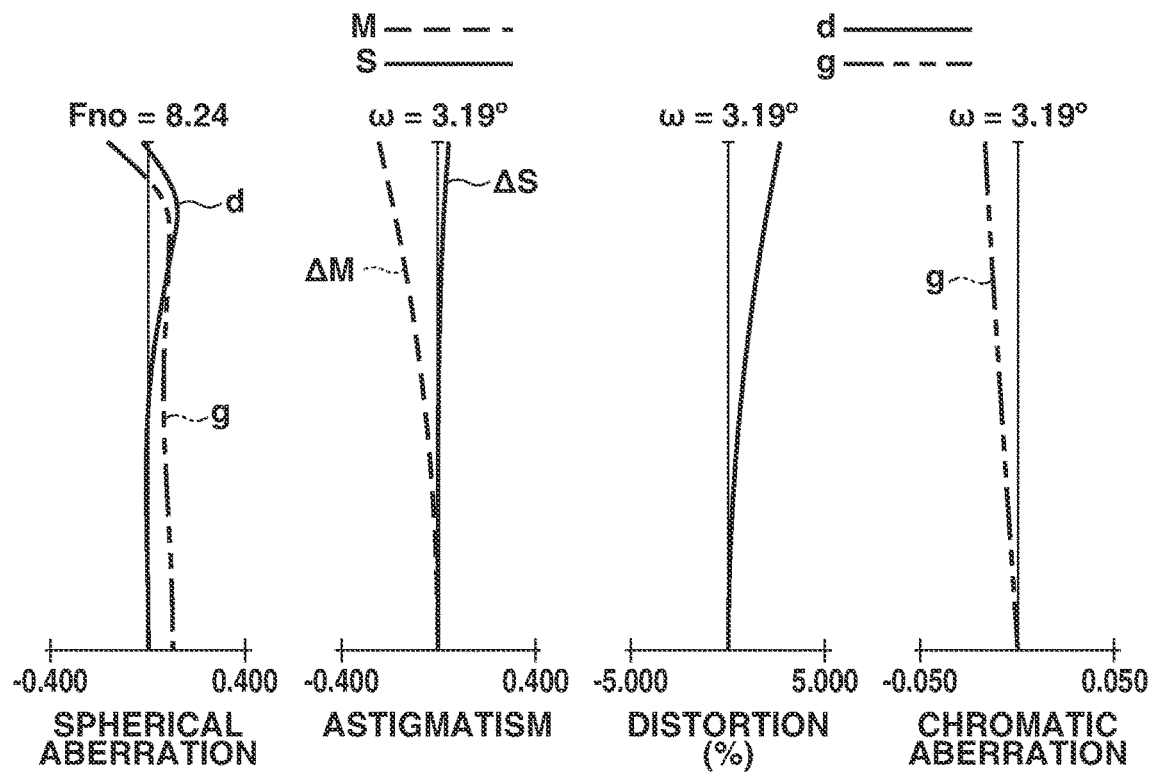
FIG. 10B is an aberration diagram of the zoom lens according to the fifth embodiment in the state focused at infinity at the telephoto end.
Figure 12A:
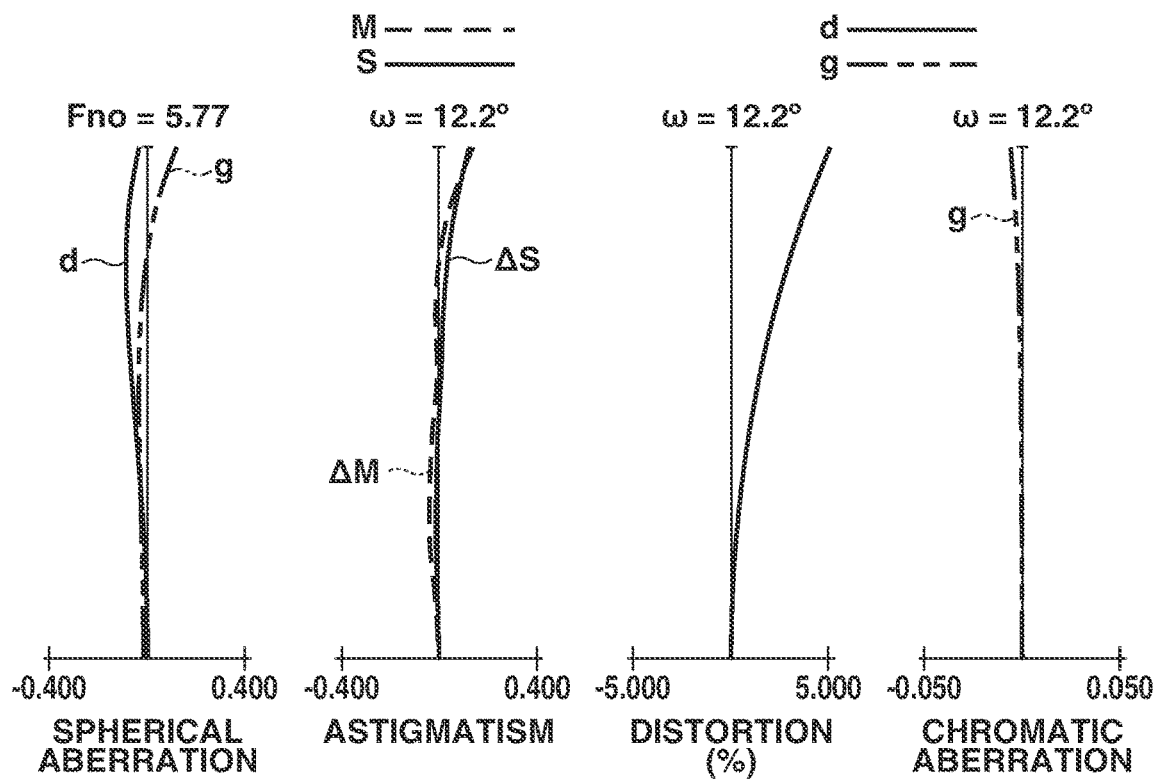
FIG. 12A is an aberration diagram of the zoom lens according to the sixth embodiment in the state focused at infinity at the wide-angle end.
Figure 12B:
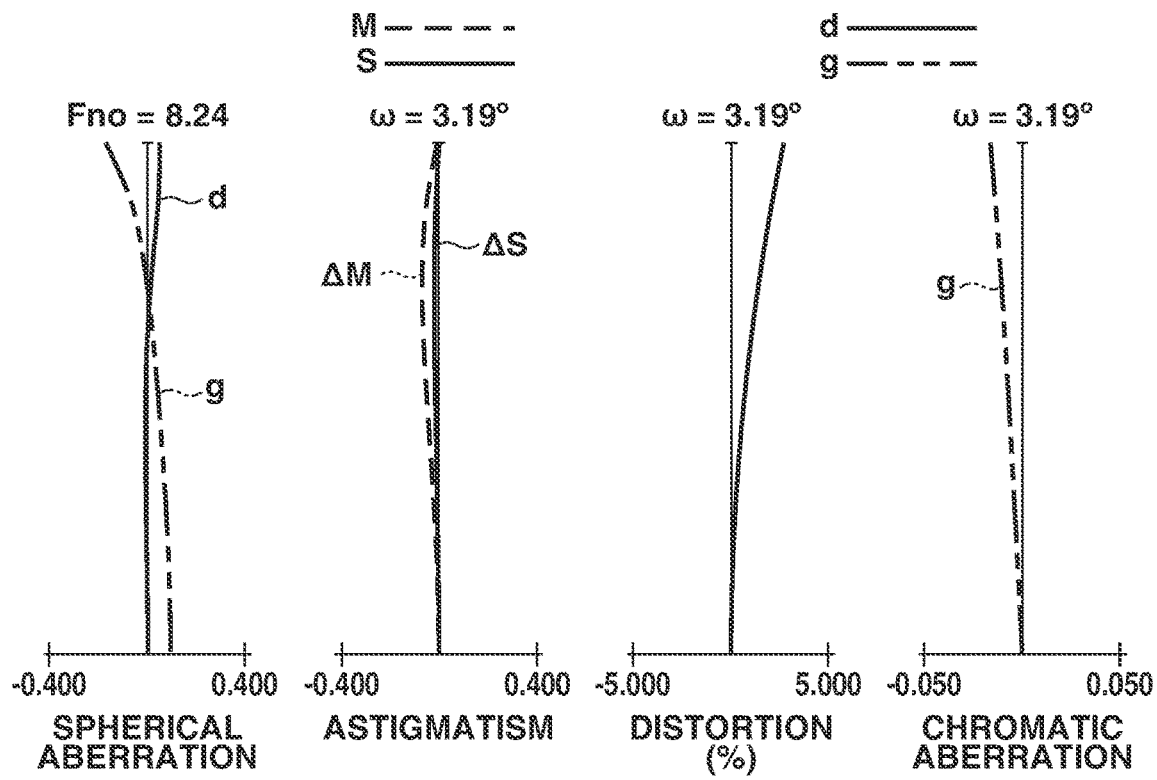
FIG. 12B is an aberration diagram of the zoom lens according to the sixth embodiment in the state focused at infinity at the telephoto end.

In the following description, embodiments of a zoom lens and an image pickup apparatus including the zoom lens according to the disclosure will be described with reference to the attached drawings. Each of the embodiments of the disclosure described below can be implemented solely or as a combination of a plurality of the embodiments. Also, features from different embodiments can be combined where necessary or where the combination of elements or features from individual embodiments in a single embodiment is beneficial.

FIGS. 1, 3, 5, 7, 9, and 11 are lens cross-sectional views when zoom lenses according to first to sixth embodiments of the disclosure are focused at infinity at a wide-angle end. FIGS. 2A, 2B, 4A, 4B, 6A, 6B, 8A, 8B, 10A, 10B, 12A, and 12B are aberration diagrams of the zoom lenses according to the first to sixth embodiments. The zoom lenses according to the embodiments can be employed in an image pickup apparatus such as a digital video camera, a digital still camera, a broadcast camera, a silver-halide film camera, and a monitoring camera.

In each of the cross-sectional views, the left side and the right side correspond to an object side and an image side, respectively. The zoom lenses according to the embodiments each include a plurality of lens units. In each of the embodiments, the lens unit refers to a set of lenses that integrally move or stay still at the time of zooming. In other words, in each of the zoom lenses according to the embodiments, an interval between adjacent lens units changes during zooming from the wide-angle end to a telephoto end. The wide-angle end and the telephoto end refer to zoom states where each of the lens units that moves for zooming is located at either of ends of a range in which the lens unit can mechanically move in an optical axis direction. The lens unit may be formed by one lens or may be formed by a plurality of lenses. An aperture stop may be included in the lens unit or may be a different member from the lens unit.

In each of the lens cross-sectional views, Li represents an i-th lens unit, where i indicates the order when the lens units are numbered sequentially, starting from the object side. The zoom lens includes an aperture stop SP. A flare-cut stop FP cuts unnecessary light. Each of the lens cross-sectional views also illustrates an image plane IP. When a zoom lens L0 according to each of the embodiments is used as an imaging optical system in a digital video camera or a digital still camera, an imaging plane of a solid-state image sensor (photoelectric conversion element), such as a charge coupled device (CCD) sensor and a complementary metal-oxide semiconductor (CMOS) sensor, is placed on the image plane IP. When the zoom lens L0 according to each of the embodiments is used as an imaging optical system in a silver-halide film camera, a photosensitive surface of a film is placed on the image plane IP.

In the zoom lens L0 according to each of the embodiments, each of the lens units moves as indicated by an arrow (solid line) in each of the lens cross-sectional views during zooming from the wide-angle end to the telephoto end.

Further, each of the lens units moves as indicated by an arrow (dotted line) at the time of focusing from infinity to a short range.

FIGS. 2A and 2B, 4A and 4B, 6A and 6B, 8A and 8B, 10A and 10B, and 12A and 12B are aberration diagrams of the zoom lenses L0 according to the first to sixth embodiments, respectively. Among the aberration diagrams, FIGS. 2A, 4A, 6A, 8A, 10A, and 12A each illustrate an aberration in a state focused at infinity at the wide-angle end, and FIGS. 2B, 4B, 6B, 8B, 10B, and 12B each illustrate an aberration in a state focused at infinity at the telephoto end.

In a spherical aberration diagram, Fno represents the f-number. In the spherical aberration diagram, spherical aberration amounts with respect to the d-line (wavelength 587.6 nm) and the g-line (wavelength 435.8 nm) are indicated by a solid line and an alternate long and two short dashes line, respectively. In an astigmatism diagram, S represents an astigmatism amount (solid line) on a sagittal image plane, and M represents an astigmatism amount (broken line) on a meridional image plane. A distortion amount with respect to the d-line is indicated in a distortion diagram. A chromatic aberration amount with respect to the g-line is indicated in a chromatic aberration diagram. The symbol ω represents a half angle of view (degrees).

Next, a characteristic configuration in each of the zoom lenses L0 according to the embodiments will be described.

Each of the zoom lenses L0 according to the embodiments includes a first lens unit L1 having a positive refractive power, a second lens unit L2 having a negative refractive power, a third lens unit L3 having a positive refractive power, an intermediate lens group LM including a plurality of lens units, and a last lens unit LR having a negative refractive power, which are arranged in order from the object side to the image side.

The intermediate lens group LM includes at least a negative lens unit LN having a negative refractive power. Both the negative lens unit LN and the last lens unit LR move to the object side during zooming from the wide-angle end to the telephoto end.

In the first and third embodiments, the intermediate lens group LM includes a fourth lens unit L4 to a sixth lens unit L6, and the sixth lens unit L6 corresponds to the negative lens unit LN. A seventh lens unit L7 corresponds to the last lens unit LR.

In the second embodiment, the intermediate lens group LM includes the fourth lens unit L4 to the seventh lens unit L7, and the sixth lens unit L6 corresponds to the negative lens unit LN. An eighth lens unit L8 corresponds to the last lens unit LR.

In the fourth embodiment, the intermediate lens group LM includes the fourth lens unit L4 and the fifth lens unit L5, and the fourth lens unit L4 corresponds to the negative lens unit LN. The sixth lens unit L6 corresponds to the last lens unit LR.

In the fifth embodiment, the intermediate lens group LM includes the fourth lens unit L4 and the fifth lens unit L5, and the fifth lens unit L5 corresponds to the negative lens unit LN. The sixth lens unit L6 corresponds to the last lens unit LR.

In the sixth embodiment, the intermediate lens group LM includes the fourth lens unit L4 to the sixth lens unit L6, and the fifth lens unit L5 corresponds to the negative lens unit LN. The seventh lens unit L7 corresponds to the last lens unit LR.

In this manner, each of the zoom lenses L0 according to the embodiments is a positive lead-type zoom lens, and at least two lens units each having a negative refractive power, the negative lens unit LN and the last lens unit LR, are disposed closer to the image than the third lens unit L3 is. Due to this configuration, the zoom lens L0 is constructed in a telephoto-type power arrangement. Further, the zoom lens L0 causes both the negative lens unit LN and the last lens unit LR to move during zooming from the wide-angle end to the telephoto end, thereby causing them to work for magnification. Due to these characteristics, each of the zoom lenses L0 according to the embodiments guarantees the magnification ratio while achieving the size reduction at the same time.

Meanwhile, disposing a plurality of lens units each having a negative refractive power on the image plane side leads to an axial ray diverging near the image plane, thereby increasing a height of the axial ray passing through near the stop and raising a problem with corrections of a spherical aberration and an axial chromatic aberration. Further, an increase in the number of lens units each having a negative refractive power makes the Petzval sum tend to have a large negative value, thereby raising a problem with a correction of a curvature of field.

Thus, in each of the zoom lenses L0 according to the embodiments, powers and movement amounts of the lens units and a position of the aperture stop SP are appropriately set with the aim of achieving the size reduction while enhancing the performance at the same time. More specifically, each of the zoom lenses L0 according to the embodiments is configured to satisfy all of the following conditional inequalities (1) to (3).

$$0.10 < fLN/f2 < 1.20 \quad (1)$$

$$0.25 < ML3/MLN < 0.70 \quad (2)$$

$$0.45 < DSPw/TDw < 0.95 \quad (3)$$

In the inequalities, fLN is the focal length of the negative lens unit LN. The variable f2 is the focal length of the second lens unit L2. The variable ML3 is the movement amount of the third lens unit L3 during zooming from the wide-angle end to the telephoto end when the zoom lens L0 is focused at infinity. The variable MLN is the movement amount of the negative lens unit LN during zooming from the wide-angle end to the telephoto end when the zoom lens L0 is focused at infinity. The variable DSPw is the distance on the optical axis from the aperture stop SP to a lens surface of the zoom lens L0 located closest to the image at the wide-angle end. The variable TDw is the distance on the optical axis from a lens surface of the zoom lens L0 located closest to the object to the lens surface of the zoom lens L0 located closest to the image at the wide-angle end.

In a case where a cover glass or the like substantially having no refractive power is disposed on the object side or the image side of the zoom lens L0, a surface thereof is not counted as the lens surface in terms of the values of DSPw and TDw.

The conditional inequality (1) defines a condition regarding the focal length fLN of the negative lens unit LN and the focal length f2 of the second lens unit L2. Both the size reduction and the increase in the image quality can be achieved at the same time by appropriately setting a ratio between the focal lengths of these lens units. A value of the ratio lower than a lower limit value defined by the conditional inequality (1) is undesirable because this means that the focal length of the negative lens unit LN is excessively short compared to the focal length of the second lens unit L2, thereby leading to a large negative value of the Petzval sum and making it difficult to correct a curvature of field. The value of the ratio higher than an upper limit value defined by the conditional inequality (1) is undesirable because this means that the focal length of the negative lens unit LN is excessively long compared to the focal length of the second lens unit L2, thereby making it difficult to establish the telephoto-type power arrangement, and thus making it difficult to reduce the size of the zoom lens L0 as a result thereof.

The conditional inequality (2) defines a condition regarding the movement amount ML3 of the third lens unit L3 and the movement amount MLN of the negative lens unit LN during zooming from the wide-angle end to the telephoto end. Appropriately setting a ratio between these movement amounts facilitates the size reduction of the zoom lens L0. Setting the movement amount of the negative lens unit LN to a greater amount than the movement amount of the third lens unit L3 can reduce an interval between the second lens unit L2 and the third lens unit L3 at the wide-angle end, thereby facilitating the size reduction. A value of the ratio lower than a lower limit value defined by the conditional inequality (2) is undesirable because this means that the movement amount of the negative lens unit LN is excessively great compared to the movement amount of the third lens unit L3, thereby making it difficult to reduce the size of the zoom lens L0. The value of the ratio higher than an upper limit value defined by the conditional inequality (2) is undesirable because this means that the movement amount of the negative lens unit LN is excessively small compared to the movement amount of the third lens unit L3, thereby making it difficult to reduce the size of the zoom lens L0.

The conditional inequality (3) defines a condition regarding the distance on the optical axis from the aperture stop SP to the lens surface located closest to the image and the distance on the optical axis from the lens surface located closest to the object to the lens surface located closest to the image at the wide-angle end. Disposing the aperture stop SP at an appropriate position facilitates reducing the size while enlarging the aperture of the zoom lens L0. A value of the ratio lower than a lower limit value defined by the conditional inequality (3) is undesirable because this means that the aperture stop SP is excessively close to the image plane IP, thereby leading to an increase in the size of a lens disposed at a position close to the object. As a result, such a value makes it difficult to reduce the size of the zoom lens L0. The value of the ratio higher than an upper limit value defined by the conditional inequality (3) is undesirable because this means that the aperture stop SP is located excessively close to the object, thereby making it difficult to dispose the aperture stop SP.

The advantageous effects of the disclosure can be acquired by satisfying these conditions. Regarding the configuration of the intermediate lens group LM, the advantageous effects of the disclosure can be acquired as long as the intermediate lens group LM includes a plurality of lens units and further includes at least one negative lens unit LN satisfying the above-described conditions. In other words, the intermediate lens group LM may include two or more lens units corresponding to the negative lens unit LN.

More desirably, the numerical ranges of the conditional inequalities (1) to (3) are set to ranges according to the following conditional inequalities (1a) to (3a).

$$0.30 < fLN/f2 < 1.17 \quad (1a)$$

$$0.26 < ML3/MLN < 0.69 \quad (2a)$$

$$0.50 < DSPw/TDw < 0.90 \quad (3a)$$

Further, the numerical ranges of the conditional inequalities (1) to (3) are further more desirably set to ranges according to the following conditional inequalities (1b) to (3b).

$$0.50<fLN/f2<1.15 \quad (1b)$$

$$0.26<ML3/MLN<0.68 \quad (2b)$$

$$0.55<DSPw/TDw<0.80 \quad (3b)$$

Next, a configuration that each of the zoom lenses L0 according to the embodiments desirably satisfies will be described.

Desirably, the first lens unit L1 moves to the object side during zooming from the wide-angle end to the telephoto end. This configuration allows the zoom lens L0 to have a reduced total optical length at the wide-angle end, thereby allowing the zoom lens L0 to achieve the size reduction.

Desirably, both the negative lens unit LN and the last lens unit LR are each composed of three or less lenses. This configuration allows the zoom lens L0 to achieve the size reduction while acquiring a sufficient performance with respect to the negative lens unit LN and the last lens unit LR.

Desirably, the aperture stop SP is disposed closer to the object than the intermediate lens group LM is. This configuration allows the zoom lens L0 to achieve the enlargement of the aperture of the zoom lens L0 while achieving the reduction of the size of the lens unit(s) disposed closer to the object than the aperture stop SP is at the same time.

Desirably, the negative lens unit LN is caused to move toward the image side at the time of the focusing from infinity to a short range. Generally, a great movement amount is necessary for the focusing from infinity to a close range at the telephoto end. Thus, while the negative lens unit LN moves toward the object side during zooming, the zoom lens L0 carries out the focusing by moving the negative lens unit LN toward the image side, thereby being able to make effective use of the space on the image side of the negative lens unit LN especially at the telephoto end. As a result, the size reduction of the zoom lens L0 and the reduction of a focusing distance to the closest range are achieved.

Further, any one of the lens units may be entirely or partially caused to move in a direction having a component perpendicular to the optical axis when an image blur is corrected. The movement amount can be reduced when the image blur is corrected by especially moving the second lens unit L2 when the image blur is corrected. As a result, the zoom lens L0 can easily achieve the size reduction (especially the radial size). Further, in this case, desirably, the second lens unit L2 does not move for zooming because this can simplify a driving mechanism for an image blur correction and a holding mechanism of the lens unit.

Desirably, a positive lens unit LP having a positive refractive power is disposed at a position adjacent to the negative lens unit LN on the object side. The presence of the positive lens unit LP allows the negative lens unit LN to have a smaller lens diameter. The positive lens unit LP is the fifth lens unit L5 in the first to third embodiments, the third lens unit L3 in the fourth embodiment, and the fourth lens unit L4 in the fifth and sixth embodiments. In this manner, the positive lens unit LP does not necessarily have to be disposed in the intermediate lens group LM, and the third lens unit L3 may function as the positive lens unit LP.

Next, conditions that each of the zoom lenses L0 according to the embodiments desirably satisfies will be described.

Desirably, each of the zoom lenses L0 according to the embodiments satisfies one or more conditional inequalities among the following conditional inequalities (4) to (12).

$$-0.35<\Delta D2/\Delta D1<-0.01 \quad (4)$$

$$0.05<SKw/fw<0.50 \quad (5)$$

$$0.05<SKw/SKt<0.60 \quad (6)$$

$$1.0<LDw/fw<3.5 \quad (7)$$

$$0.10<fLP/f1<0.70 \quad (8)$$

$$0.05<fLN/fLR<1.50 \quad (9)$$

$$0<|ML3/ML1|<0.50 \quad (10)$$

$$0.15<(t\beta LN/w\beta LN)/(ft/fw)<0.70 \quad (11)$$

$$65.00<vd1Pave<99.00 \quad (12)$$

In these inequalities, $\Delta D1$ is a difference between (a) an interval on the optical axis between a lens surface of the first lens unit L1 located closest to the image and a lens surface of the second lens unit L2 located closest to the object at the wide-angle end and (b) an interval on the optical axis between the lens surface of the first lens unit L1 located closest to the image and the lens surface of the second lens unit L2 located closest to the object at the telephoto end. The variable $\Delta D2$ is a difference between (a) an interval on the optical axis between a lens surface of the second lens unit L2 located closest to the image and a lens surface of the third lens unit L3 located closest to the object at the wide-angle end and (b) an interval on the optical axis between the lens surface of the second lens unit L2 located closest to the image and the lens surface of the third lens unit L3 located closest to the object at the telephoto end. The variable SKw is a backfocus of the zoom lens L0 at the wide-angle end. The variable fw is a focal length of the zoom lens L0 at the wide-angle end. The variable SKt is a backfocus of the zoom lens L0 at the telephoto end. The variable LDw is a total optical length (distance from the lens surface located closest to the object to the image plane IP) of the zoom lens L0 at the wide-angle end. The variable fLP is a focal length of the positive lens unit LP disposed adjacent to the negative lens unit LN on the object side. The variable f1 is a focal length of the first lens unit L1. The variable fLR is a focal length of the last lens unit LR. The variable ML1 is a movement amount of the first lens unit L1 during zooming from the wide-angle end to the telephoto end when focused at infinity. The variable t$\beta$LN is a lateral magnification of the negative lens unit LN at the telephoto end. The variable w$\beta$LN is a lateral magnification of the negative lens unit LN at the wide-angle end. The variable vd1Pave is an average value of Abbe number(s) of the positive lens(es) included in the first lens unit L1 with respect to the d-line.

The conditional inequality (4) defines a condition regarding the change amount $\Delta D1$ of an interval between the first lens unit L1 and the second lens unit L2 during zooming from the wide-angle end to the telephoto end and the change amount $\Delta D2$ of an interval between the second lens unit L2 and the third lens unit L3 during zooming from the wide-angle end to the telephoto end. In a case where the aperture stop SP or the flare-cut stop FP is disposed in a range extending from the first lens unit L1 to the third lens unit L3, the aperture stop SP or the flare-cut stop FP is not taken into consideration when $\Delta D1$ and $\Delta D2$ are calculated. An excessive increase in $\Delta D2$ enough to cause the ratio to fall below the lower limit value defined by the conditional inequality (4) is undesirable because the sufficient size reduction becomes difficult especially at the wide-angle end. An excessive reduction in $\Delta D2$ enough to cause the ratio to exceed the upper limit value defined by the conditional inequality (4) is undesirable because a share of zooming ratio assigned to the second lens unit L2 and the third lens unit L3 is reduced, thereby making it difficult to achieve the provision of a sufficiently high zooming ratio.

The conditional inequality (5) defines a condition regarding the backfocus SKw at the wide-angle end and the focal length fw of the entire system at the wide-angle end. A value of the ratio lower than a lower limit value defined by the conditional inequality (5) is undesirable because this means that the backfocus is short, thereby making it difficult to dispose an optical element such as a low-pass filter near the image sensor. A value of the ratio higher than an upper limit value defined by the conditional inequality (5) is undesirable because this means that the backfocus is long, thereby making it impossible to sufficiently reduce the total optical length at the wide-angle end.

The conditional inequality (6) defines a condition regarding the backfocus SKt at the telephoto end and the backfocus SKw at the wide-angle end. A value of the ratio lower than a lower limit value defined by the conditional inequality (6) is undesirable because this means that the backfocus is excessively short at the wide-angle end, thereby making it difficult to dispose an optical element such as a low-pass filter near the image sensor. A value of the ratio higher than an upper limit value defined by the conditional inequality (6) is undesirable because this means that the backfocus is excessively long at the wide-angle end, thereby making it impossible to sufficiently reduce the total optical length at the wide-angle end.

The conditional inequality (7) defines a condition regarding the total optical length LDw at the wide-angle end and the focal length fw of the entire system at the wide-angle end. A value of the ratio lower than a lower limit value defined by the conditional inequality (7) is undesirable because this means that the focal length of the entire system is excessively long at the wide-angle end, thereby making it difficult to provide a sufficiently high magnification ratio. A value of the ratio higher than an upper limit value defined by the conditional inequality (7) is undesirable because sufficiently reducing the total optical length at the wide-angle end becomes impossible.

The conditional inequality (8) defines a condition regarding the focal length fLP of the positive lens unit LP and the focal length f1 of the first lens unit L1. A value of the ratio lower than a lower limit value defined by the conditional inequality (8) is undesirable because this means that the focal length of the positive lens unit LP is excessively short, thereby making it difficult to sufficiently correct a spherical aberration especially at the telephoto end. A value of the ratio higher than an upper limit value defined by the conditional inequality (8) is undesirable because this means that the focal length of the positive lens unit LP is extremely long, resulting in a reduction in a share of zooming ratio assigned to the positive lens unit LP, thereby making it difficult to achieve the provision of a sufficiently high zooming ratio.

The conditional inequality (9) defines a condition regarding the focal length fLN of the negative lens unit LN and the focal length fLR of the last lens unit LR. A value of the ratio lower than a lower limit value defined by the conditional inequality (9) means that the focal length of the last lens unit LR is long, thereby making it difficult to establish the telephoto-type power arrangement, and thus making it difficult to sufficiently reduce the size of the zoom lens L0 as a result thereof. A value of the ratio higher than an upper limit value defined by the conditional inequality (9) means that the focal length of the last lens unit LR is short, thereby leading to a further asymmetric power arrangement and thus making it difficult to sufficiently correct a coma aberration and a distortion especially at the telephoto end.

The conditional inequality (10) defines a condition regarding the movement amount ML1 of the first lens unit L1 during zooming from the wide-angle end to the telephoto end and the movement amount ML3 of the third lens unit L3 during zooming from the wide-angle end to the telephoto end. A value of the ratio lower than a lower limit value defined by the conditional inequality (10) is undesirable because this means that the movement amount of the first lens unit L1 is great during zooming from the wide-angle end to the telephoto end, thereby making it difficult to achieve the sufficient size reduction especially at the telephoto end. A value of the ratio higher than an upper limit value defined by the conditional inequality (10) is undesirable because this means that the movement amount of the positive lens unit LP having a positive refractive power is great during zooming from the wide-angle end to the telephoto end, thereby making it difficult to achieve the sufficient size reduction.

The conditional inequality (11) defines a condition regarding the lateral magnification tβLN of the negative lens unit LN at the telephoto end and the lateral magnification wβLN of the negative lens unit LN at the wide-angle end, and a focal length ft of the entire system at the telephoto end and the focal length fw of the entire system at the wide-angle end. A value of the ratio lower than a lower limit value defined by the conditional inequality (11) leads to a reduction in a share of zooming ratio assigned to the negative lens unit LN and thus leads to increases in shares of zooming ratio assigned to the second lens unit L2 and the third lens unit L3 as a result thereof, thereby raising necessity of increasing the interval between the second lens unit L2 and the third lens unit L3 at the wide-angle end. This case makes it difficult to sufficiently reduce the size of the zoom lens L0, and therefore is undesirable. A value of the ratio higher than an upper limit value defined by the conditional inequality (11) is undesirable because the provision of a sufficiently high zooming ratio becomes difficult.

The conditional inequality (12) is a condition regarding the average value vd1Pave of the Abbe number(s) of the positive lens(es) included in the first lens unit L1 with respect to the d-line. A value of vd1Pave smaller than a lower limit value defined by the conditional inequality (12) is undesirable because sufficiently correcting an axial chromatic aberration and a chromatic aberration of magnification at the telephoto end becomes difficult. A value of vd1Pave larger than an upper limit value defined by the conditional inequality (12) is undesirable because an excessive reduction in dispersion of the positive lens(es) in the first lens unit L1 occurs, thereby making it difficult to sufficiently correct a chromatic aberration of magnification at the wide-angle end. The number of positive lenses included in the first lens unit L1 may be one, but is desirably two or more.

More desirably, the numerical ranges of the conditional inequalities (4) to (12) are set to ranges according to the following conditional inequalities (4a) to (12a).

$$-0.33 < \Delta D2/\Delta D1 < -0.05 \tag{4a}$$

$$0.07 < SKw/fw < 0.40 \tag{5a}$$

$$0.10 < SKw/SKt < 0.55 \tag{6a}$$

$$1.2 < LDw/fw < 3.0 \tag{7a}$$

$$0.15 < fLP/f1 < 0.60 \quad (8a)$$

$$0.10 < fLN/fLR < 1.40 \quad (9a)$$

$$0.05 < |ML3/ML1| < 0.40 \quad (10a)$$

$$0.17 < (t\beta LN/w\beta LN)/(ft/fw) < 0.60 \quad (11a)$$

$$70.00 < vd1Pave < 98.00 \quad (12a)$$

Further, the numerical ranges of the conditional inequalities (4) to (12) are further more desirably set to ranges according to the following conditional inequalities (4b) to (12b).

$$-0.31 < \Delta D2/\Delta D1 < -0.10 \quad (4b)$$

$$0.09 < SKw/fw < 0.30 \quad (5b)$$

$$0.15 < SKw/SKt < 0.50 \quad (6b)$$

$$1.5 < LDw/fw < 2.5 \quad (7b)$$

$$0.22 < fLP/f1 < 0.45 \quad (8b)$$

$$0.15 < fLN/fLR < 1.25 \quad (9b)$$

$$0.10 < |ML3/ML1| < 0.35 \quad (10b)$$

$$0.18 < (t\beta LN/w\beta LN)/(ft/fw) < 0.50 \quad (11b)$$

$$75.00 < vd1Pave < 95.00 \quad (12b)$$

In the following description, numerical embodiments 1 to 6 corresponding to the first to sixth embodiments, respectively, will be described.

In surface data in each of the numerical embodiment 1 to 6, r represents a curvature radius of each optical surface, and d (mm) represents an axial interval (distance on the optical axis) between an m-th surface and an (m+1)-th surface. In this regard, m is the number of the surface when it is numbered sequentially, starting from the light incident side. Further, and represents a refractive index of each optical member with respect to the d-line, and vd represents an Abbe number of each optical member. In this regard, the Abbe number vd of a material is expressed as vd=(Nd−1)/(NF−NC), where Nd, NF, NC, and Ng represent the refractive indexes with respect to the d-line (587.6 nm), the F-line (486.1 nm), the C-line (656.3 nm), and the g-line (435.8 nm) of the Fraunhofer lines, respectively.

In each of the numerical embodiments 1 to 6, all the focal length (mm), the f-number, and the half angle of view (degrees) are values when each of the zoom lenses L0 according to the embodiments is focused on an object at infinity. A backfocus SK is an air-equivalent distance from the last lens surface to the image plane IP. A total lens length is a value obtained by adding the backfocus SK to the distance on the optical axis from the first lens surface to the last lens surface.

In a case where the optical surface is aspherical, a symbol * is added to the right side of the surface number. The aspherical shape is expressed as $x = (h^2/R)/[1+\{1-(1+k)(h/R)^2\}^{1/2}] + A4 \times h^4 + A6 \times h^6 + A8 \times h^8 + A10 \times h^{10} + A12 \times h^{12}$, where x is a displacement amount from the surface vertex in the optical axis direction, h is a height from the optical axis in the direction perpendicular to the optical axis, R is a paraxial curvature radius, k is a conic constant, and A4, A6, A8, A10, and A12 are aspherical coefficients of respective degrees. Then, "e±XX" in each of the aspherical coefficients means "$\times 10^{\pm XX}$".

Numerical Embodiment 1

| Unit mm | | | | |
|---|---|---|---|---|
| Surface Data | | | | |
| Surface Number | r | d | nd | vd |
| 1 | 90.644 | 5.00 | 1.48749 | 70.2 |
| 2 | 729.457 | 0.15 | | |
| 3 | 118.536 | 1.72 | 1.61340 | 44.3 |
| 4 | 44.444 | 7.63 | 1.49700 | 81.5 |
| 5 | 701.885 | (Variable) | | |
| 6 | ∞ | 1.55 | | |
| 7 | 61.503 | 1.45 | 1.51633 | 64.1 |
| 8 | 30.444 | 4.90 | | |
| 9 | −46.693 | 1.45 | 1.54072 | 47.2 |
| 10 | 42.460 | 2.40 | 2.00069 | 25.5 |
| 11 | 129.562 | (Variable) | | |
| 12 (Stop) | ∞ | 0.27 | | |
| 13 | 30.808 | 5.46 | 1.49700 | 81.5 |
| 14 | −114.560 | (Variable) | | |
| 15 | −34.891 | 0.76 | 1.76385 | 48.5 |
| 16 | 21.946 | 5.06 | 1.80610 | 40.7 |
| 17 | −157.249 | (Variable) | | |
| 18 | 215.866 | 0.86 | 2.05090 | 26.9 |
| 19 | 32.638 | 6.46 | 1.49700 | 81.5 |
| 20 | −41.283 | 0.15 | | |
| 21 | 40.548 | 4.63 | 1.83481 | 42.7 |
| 22 | −194.106 | (Variable) | | |
| 23 | −110.386 | 0.90 | 1.83481 | 42.7 |
| 24 | 32.543 | 3.04 | 1.72825 | 28.5 |
| 25 | 77.918 | (Variable) | | |
| 26 | −27.078 | 1.55 | 1.49700 | 81.5 |
| 27 | −77.278 | 0.15 | | |
| 28 | 133.694 | 2.87 | 1.85478 | 24.8 |
| 29 | −465.663 | (Variable) | | |
| Image Plane | ∞ | | | |

| Various Data | | | |
|---|---|---|---|
| Zoom Ratio 2.68 | | | |
| | Wide-angle | Intermediate | Telephoto |
| Focal Length | 72.27 | 135.02 | 193.89 |
| F-number | 4.08 | 4.08 | 4.12 |
| Half Angle of View (°) | 16.67 | 9.10 | 6.37 |
| Image Height | 21.64 | 21.64 | 21.64 |
| Total Lens Length | 137.50 | 175.84 | 193.12 |
| SK | 14.44 | 24.23 | 29.66 |
| d 5 | 1.04 | 39.38 | 56.66 |
| d11 | 14.15 | 7.90 | 3.56 |
| d14 | 5.42 | 9.82 | 13.52 |
| d17 | 9.21 | 4.80 | 1.11 |
| d22 | 18.91 | 9.71 | 2.24 |
| d25 | 15.94 | 21.59 | 27.98 |
| d29 | 14.44 | 24.23 | 29.66 |

| Data of Zoom Lens Unit | | |
|---|---|---|
| Unit | Starting Surface | Focal Length |
| 1 | 1 | 151.61 |
| 2 | 6 | −58.12 |
| 3 | 12 | 49.47 |
| 4 | 15 | −69.02 |
| 5 | 18 | 37.79 |
| 6 | 23 | −49.00 |
| 7 | 26 | −295.37 |

Numerical Embodiment 2

Unit mm

Surface Data

| Surface Number | r | d | nd | vd |
|---|---|---|---|---|
| 1 | 119.503 | 7.80 | 1.49700 | 81.5 |
| 2 | 1543.975 | 0.20 | | |
| 3 | 134.804 | 2.70 | 1.61340 | 44.3 |
| 4 | 64.251 | 10.35 | 1.43875 | 94.7 |
| 5 | 530.638 | 1.50 | | |
| 6 | ∞ | (Variable) | | |
| 7 | 645.729 | 1.50 | 1.69680 | 55.5 |
| 8 | 59.316 | 4.24 | | |
| 9 | −57.506 | 1.50 | 1.49700 | 81.5 |
| 10 | 72.624 | 3.00 | 1.76182 | 26.5 |
| 11 | 666.468 | (Variable) | | |
| 12 | 51.663 | 6.55 | 1.49700 | 81.5 |
| 13 | −93.175 | 0.20 | | |
| 14 | 55.810 | 5.68 | 1.59270 | 35.3 |
| 15 | −76.197 | 1.80 | 1.95375 | 32.3 |
| 16 | 94.950 | 5.00 | | |
| 17 (Stop) | ∞ | (Variable) | | |
| 18 | −38.041 | 1.10 | 1.49700 | 81.5 |
| 19 | −184.227 | (Variable) | | |
| 20 | −306.417 | 4.03 | 1.68893 | 31.1 |
| 21 | −38.365 | 0.20 | | |
| 22 | 119.586 | 4.87 | 1.51823 | 58.9 |
| 23 | −34.325 | 1.30 | 2.05090 | 26.9 |
| 24 | −185.450 | 0.20 | | |
| 25 | 46.171 | 3.45 | 1.49700 | 81.5 |
| 26 | ∞ | (Variable) | | |
| 27 | 117.951 | 2.91 | 1.64769 | 33.8 |
| 28 | −80.676 | 1.20 | 1.77250 | 49.6 |
| 29 | 38.148 | (Variable) | | |
| 30 | 56.252 | 5.89 | 1.48749 | 70.2 |
| 31 | −72.765 | (Variable) | | |
| 32 | −86.407 | 1.40 | 1.59282 | 68.6 |
| 33 | 46.956 | 4.26 | | |
| 34 | −79.513 | 1.40 | 1.49700 | 81.5 |
| 35 | 52.671 | 4.85 | 1.72047 | 34.7 |
| 36 | −431.246 | (Variable) | | |
| Image Plane | ∞ | | | |

Various Data
Zoom Ratio 4.82

| | Wide-angle | Intermediate | Telephoto |
|---|---|---|---|
| Focal Length | 101.59 | 200.00 | 490.00 |
| F-number | 4.60 | 5.09 | 6.80 |
| Half Angle of View (°) | 12.02 | 6.17 | 2.53 |
| Image Height | 21.64 | 21.64 | 21.64 |
| Total Lens Length | 222.29 | 279.43 | 312.29 |
| SK | 21.06 | 29.20 | 64.12 |
| d 6 | 6.27 | 63.40 | 96.27 |
| d11 | 28.49 | 23.08 | 1.30 |
| d17 | 13.65 | 20.89 | 26.39 |
| d19 | 14.76 | 7.52 | 2.02 |
| d26 | 15.47 | 8.53 | 2.21 |
| d29 | 14.92 | 21.85 | 28.18 |
| d31 | 18.60 | 15.86 | 2.73 |
| d36 | 21.06 | 29.20 | 64.12 |

Data of Zoom Lens Unit

| Unit | Starting Surface | Focal Length |
|---|---|---|
| 1 | 1 | 203.68 |
| 2 | 7 | −58.65 |
| 3 | 12 | 81.58 |
| 4 | 18 | −96.70 |
| 5 | 20 | 47.80 |
| 6 | 27 | −62.34 |
| 7 | 30 | 66.07 |
| 8 | 32 | −50.81 |

Numerical Embodiment 3

Unit mm

Surface Data

| Surface Number | r | d | nd | vd |
|---|---|---|---|---|
| 1 | 99.618 | 7.70 | 1.49700 | 81.5 |
| 2 | 581.439 | 0.20 | | |
| 3 | 107.681 | 2.40 | 1.61340 | 44.3 |
| 4 | 51.460 | 12.70 | 1.43875 | 94.7 |
| 5 | ∞ | (Variable) | | |
| 6 | ∞ | 3.67 | | |
| 7 | −617.950 | 1.45 | 1.59282 | 68.6 |
| 8 | 66.515 | 3.79 | | |
| 9 | −81.698 | 1.30 | 1.76385 | 48.5 |
| 10 | 42.750 | 4.40 | 1.85478 | 24.8 |
| 11 | 285.171 | (Variable) | | |
| 12 (Stop) | ∞ | 0.50 | | |
| 13* | 52.335 | 7.05 | 1.49700 | 81.5 |
| 14 | −87.607 | (Variable) | | |
| 15 | −34.350 | 1.20 | 1.59270 | 35.3 |
| 16 | 51.821 | 5.00 | 1.72825 | 28.5 |
| 17 | −93.944 | (Variable) | | |
| 18 | 126.864 | 1.35 | 2.05090 | 26.9 |
| 19 | 45.374 | 6.25 | 1.49700 | 81.5 |
| 20 | −64.472 | 0.15 | | |
| 21 | 114.577 | 5.80 | 1.49700 | 81.5 |
| 22 | −44.904 | 1.35 | 2.05090 | 26.9 |
| 23 | −77.708 | 0.15 | | |
| 24 | 61.735 | 4.45 | 1.90043 | 37.4 |
| 25 | −412.192 | (Variable) | | |
| 26 | 159.922 | 1.20 | 1.61800 | 63.4 |
| 27 | 27.965 | (Variable) | | |
| 28 | −113.431 | 3.20 | 1.85478 | 24.8 |
| 29 | −46.333 | 6.54 | | |
| 30* | −23.301 | 1.90 | 1.58313 | 59.4 |
| 31 | −70.381 | (Variable) | | |
| Image Plane | ∞ | | | |

Aspherical Data

Thirteenth Surface

K = 0.00000e+000 A 4 = −1.09244e−006 A 6 = 1.04634e−009
A 8 = 2.02132e−013

Thirtieth Surface

K = 0.00000e+000 A 4 = 1.09140e−005 A 6 = 1.43304e−008
A 8 = −2.54590e−011 A10 = 1.38882e−013 A12 = −1.16760e−016

Various Data
Zoom Ratio 2.69

| | Wide-angle | Intermediate | Telephoto |
|---|---|---|---|
| Focal Length | 72.13 | 100.00 | 194.06 |
| F-number | 2.89 | 2.89 | 2.91 |
| Half Angle of View (°) | 16.70 | 12.21 | 6.36 |
| Image Height | 21.64 | 21.64 | 21.64 |
| Total Lens Length | 161.59 | 187.06 | 220.03 |
| SK | 15.86 | 20.68 | 31.81 |
| d 5 | 1.50 | 26.97 | 59.94 |
| d11 | 10.41 | 9.24 | 2.90 |
| d14 | 9.57 | 12.46 | 18.11 |
| d17 | 9.69 | 6.80 | 1.15 |
| d25 | 13.80 | 10.49 | 1.21 |

-continued

| Unit mm | | | |
|---|---|---|---|
| d27 | 17.06 | 16.73 | 21.22 |
| d31 | 15.86 | 20.68 | 31.81 |

Data of Zoom Lens Unit

| Unit | Starting Surface | Focal Length |
|---|---|---|
| 1 | 1 | 155.12 |
| 2 | 6 | -48.48 |
| 3 | 12 | 67.04 |
| 4 | 15 | -155.65 |
| 5 | 18 | 38.75 |
| 6 | 26 | -55.03 |
| 7 | 28 | -224.14 |

Numerical Embodiment 4

| Unit mm | | | | |
|---|---|---|---|---|
| Surface Data | | | | |
| Surface Number | r | d | nd | vd |
| 1 | 50.864 | 4.08 | 1.49700 | 81.5 |
| 2 | 307.519 | 0.15 | | |
| 3 | 53.500 | 1.50 | 1.88300 | 40.8 |
| 4 | 31.167 | 5.25 | 1.49700 | 81.5 |
| 5 | 180.861 | (Variable) | | |
| 6 | -246.352 | 0.80 | 1.76385 | 48.5 |
| 7 | 12.863 | 2.58 | 1.85478 | 24.8 |
| 8 | 53.530 | 0.61 | | |
| 9 | -132.104 | 0.70 | 1.76385 | 48.5 |
| 10 | 44.839 | (Variable) | | |
| 11 (Stop) | ∞ | 0.10 | | |
| 12 | 61.385 | 1.71 | 1.77250 | 49.6 |
| 13 | -71.862 | 0.15 | | |
| 14 | 28.076 | 2.36 | 1.49700 | 81.5 |
| 15 | -42.418 | 0.80 | 2.05090 | 26.9 |
| 16 | 121.058 | 7.30 | | |
| 17 | 240.613 | 0.70 | 2.05090 | 26.9 |
| 18 | 21.375 | 2.50 | 1.51742 | 52.4 |
| 19 | -45.645 | 0.10 | | |
| 20 | 25.049 | 2.05 | 1.83400 | 37.2 |
| 21 | -151.724 | (Variable) | | |
| 22 | 129.389 | 1.21 | 1.85896 | 22.7 |
| 23 | -73.555 | 0.70 | 1.72916 | 54.7 |
| 24 | 15.751 | (Variable) | | |
| 25 | 232.809 | 2.91 | 1.69680 | 55.5 |
| 26 | -26.286 | (Variable) | | |
| 27* | -34.927 | 1.29 | 1.53110 | 55.9 |
| 28 | -34.250 | 0.62 | | |
| 29 | -23.969 | 1.00 | 1.61997 | 63.9 |
| 30 | 90.458 | (Variable) | | |
| Image Plane | ∞ | | | |

Aspherical Data

Twenty-seventh Surface $K = 0.00000e+000$ $A 4 = 1.35565e-005$ $A 6 = 5.97629e-008$
$A 8 = -1.22936e-009$ $A10 = 1.83400e-011$ $A12 = -8.70844e-014$ Various Data
Zoom Ratio 4.24

| | Wide-angle | Intermediate | Telephoto |
|---|---|---|---|
| Focal Length | 56.90 | 130.00 | 241.30 |
| F-number | 4.68 | 5.88 | 6.55 |
| Half Angle of View (°) | 13.50 | 6.00 | 3.24 |
| Image Height | 13.66 | 13.66 | 13.66 |
| Total Lens Length | 102.01 | 140.24 | 153.08 |

-continued

| Unit mm | | | |
|---|---|---|---|
| SK | 13.47 | 21.19 | 39.32 |
| d 5 | 1.39 | 39.62 | 52.46 |
| d10 | 11.64 | 8.48 | 1.51 |
| d21 | 8.00 | 4.17 | 1.00 |
| d24 | 12.84 | 17.94 | 16.63 |
| d26 | 13.50 | 7.68 | 1.00 |
| d30 | 13.47 | 21.19 | 39.32 |

Data of Zoom Lens Unit

| Unit | Starting Surface | Focal Length |
|---|---|---|
| 1 | 1 | 100.57 |
| 2 | 6 | -28.63 |
| 3 | 11 | 23.71 |
| 4 | 22 | -26.64 |
| 5 | 25 | 34.05 |
| 6 | 27 | -30.55 |

Numerical Embodiment 5

| Unit mm | | | | |
|---|---|---|---|---|
| Surface Data | | | | |
| Surface Number | r | d | nd | vd |
| 1 | 136.654 | 4.00 | 1.49700 | 81.5 |
| 2 | -703.912 | 0.10 | | |
| 3 | 86.100 | 1.90 | 1.90366 | 31.3 |
| 4 | 60.976 | 5.18 | 1.49700 | 81.5 |
| 5 | 215.826 | (Variable) | | |
| 6 | ∞ | 5.36 | | |
| 7 | -109.580 | 1.15 | 1.80420 | 46.5 |
| 8 | 26.174 | 2.38 | 2.00069 | 25.5 |
| 9 | 58.357 | (Variable) | | |
| 10 (Stop) | ∞ | 0.27 | | |
| 11 | 42.804 | 4.90 | 1.49700 | 81.5 |
| 12 | -25.433 | 0.49 | | |
| 13 | -25.227 | 1.00 | 1.83481 | 42.7 |
| 14 | -53.458 | (Variable) | | |
| 15 | -187.240 | 0.95 | 1.96300 | 24.1 |
| 16 | 61.641 | 0.27 | | |
| 17 | 94.276 | 3.65 | 1.54072 | 47.2 |
| 18 | -39.393 | 0.15 | | |
| 19 | 54.961 | 2.10 | 1.95375 | 32.3 |
| 20 | 287.680 | (Variable) | | |
| 21 | -507.302 | 2.77 | 1.85896 | 22.7 |
| 22 | -45.863 | 1.20 | 1.72916 | 54.7 |
| 23 | 35.643 | (Variable) | | |
| 24 | -41.056 | 1.00 | 2.00100 | 29.1 |
| 25 | -55.222 | (Variable) | | |
| Image Plane | ∞ | | | |

Various Data
Zoom Ratio 3.75

| | Wide-angle | Intermediate | Telephoto |
|---|---|---|---|
| Focal Length | 103.39 | 196.91 | 387.69 |
| F-number | 5.77 | 7.10 | 8.24 |
| Half Angle of View (°) | 11.82 | 6.27 | 3.19 |
| Image Height | 21.64 | 21.64 | 21.64 |
| Total Lens Length | 165.42 | 201.96 | 235.42 |
| SK | 13.85 | 33.27 | 57.50 |
| d 5 | 12.08 | 48.63 | 82.08 |
| d 9 | 22.83 | 17.97 | 2.81 |
| d14 | 35.39 | 20.84 | 11.77 |
| d20 | 26.08 | 14.86 | 1.71 |
| d23 | 16.38 | 27.60 | 40.74 |
| d25 | 13.85 | 33.27 | 57.50 |

-continued

Unit mm

Data of Zoom Lens Unit

| Unit | Starting Surface | Focal Length |
|---|---|---|
| 1 | 1 | 165.52 |
| 2 | 6 | -58.75 |
| 3 | 10 | 72.11 |
| 4 | 15 | 71.34 |
| 5 | 21 | -51.68 |
| 6 | 24 | -165.74 |

Numerical Embodiment 6

Unit mm

Surface Data

| Surface Number | r | d | nd | vd |
|---|---|---|---|---|
| 1 | 86.618 | 4.72 | 1.43875 | 94.7 |
| 2 | 1260.642 | 0.10 | | |
| 3 | 74.128 | 1.70 | 1.88300 | 40.8 |
| 4 | 50.653 | 6.14 | 1.43875 | 94.7 |
| 5 | 322.719 | (Variable) | | |
| 6 | ∞ | 3.48 | | |
| 7 | -149.961 | 1.15 | 1.72916 | 54.7 |
| 8 | 23.539 | 2.61 | 1.85883 | 30.0 |
| 9 | 51.195 | (Variable) | | |
| 10 (Stop) | ∞ | 0.27 | | |
| 11 | 45.951 | 3.80 | 1.49700 | 81.5 |
| 12 | -41.869 | 5.61 | | |
| 13 | -30.486 | 0.80 | 1.75500 | 52.3 |
| 14 | -103.796 | (Variable) | | |
| 15 | 1385.106 | 0.80 | 1.98612 | 16.5 |
| 16 | 71.115 | 0.32 | | |
| 17 | 103.260 | 3.74 | 1.51742 | 52.2 |
| 18 | -37.827 | 0.15 | | |
| 19 | 48.317 | 2.40 | 1.67270 | 32.1 |
| 20 | 975.142 | (Variable) | | |
| 21 | 198.064 | 1.00 | 1.95375 | 32.3 |
| 22 | 23.309 | 2.35 | 1.98612 | 16.5 |
| 23 | 36.256 | (Variable) | | |
| 24 | -139.520 | 2.24 | 1.67270 | 32.1 |
| 25 | -55.923 | (Variable) | | |
| 26 | -47.418 | 1.00 | 1.49700 | 81.5 |
| 27 | 572.236 | (Variable) | | |
| Image Plane | ∞ | | | |

Various Data
Zoom Ratio 3.88

| | Wide-angle | Intermediate | Telephoto |
|---|---|---|---|
| Focal Length | 100.04 | 198.04 | 387.80 |
| F-number | 5.77 | 7.10 | 8.24 |
| Half Angle of View (°) | 12.20 | 6.23 | 3.19 |
| Image Height | 21.64 | 21.64 | 21.64 |
| Total Lens Length | 159.40 | 202.97 | 229.40 |
| SK | 10.02 | 28.12 | 62.23 |
| d 5 | 1.50 | 45.06 | 71.50 |
| d 9 | 17.91 | 19.30 | 2.97 |
| d14 | 27.39 | 16.67 | 12.79 |
| d20 | 25.74 | 13.16 | 0.62 |
| d23 | 8.32 | 20.90 | 33.44 |
| d25 | 24.16 | 15.38 | 1.48 |
| d27 | 10.02 | 28.12 | 62.23 |

Data of Zoom Lens Unit

| Unit | Starting Surface | Focal Length |
|---|---|---|
| 1 | 1 | 149.91 |
| 2 | 6 | -61.92 |
| 3 | 10 | 132.62 |
| 4 | 15 | 51.43 |
| 5 | 21 | -48.24 |
| 6 | 24 | 137.26 |
| 7 | 26 | -88.06 |

The various values in each of the numerical embodiments 1 to 6 are provided in Table 1 below.

TABLE 1

| | Embodiment 1 | Embodiment 2 | Embodiment 3 | Embodiment 4 | Embodiment 5 | Embodiment 6 |
|---|---|---|---|---|---|---|
| fw | 72.27 | 101.59 | 72.13 | 56.90 | 103.39 | 100.04 |
| ft | 193.89 | 490.00 | 194.06 | 241.30 | 387.69 | 387.80 |
| f1 | 151.61 | 203.68 | 155.12 | 100.57 | 165.52 | 149.91 |
| f2 | -58.12 | -58.65 | -48.48 | -28.63 | -58.75 | -61.92 |
| fLP | 37.79 | 47.80 | 38.75 | 23.71 | 71.34 | 51.43 |
| fLN | -49.00 | -62.34 | -55.03 | -26.64 | -51.68 | -48.24 |
| fLR | -295.37 | -50.81 | -224.14 | -30.55 | -165.74 | -88.06 |
| ML1 | -55.62 | -90.00 | -58.44 | -51.07 | -70.00 | -70.00 |
| ML3 | -10.59 | -27.19 | -7.51 | -10.13 | -20.03 | -14.94 |
| MLN | -27.25 | -40.45 | -20.11 | -17.14 | -68.01 | -54.65 |
| LDw | 137.50 | 222.29 | 161.59 | 99.16 | 165.42 | 159.40 |
| TDw | 123.07 | 201.24 | 145.73 | 88.54 | 151.57 | 149.39 |
| DSPw | 81.63 | 114.45 | 96.21 | 59.85 | 96.59 | 110.08 |
| ΔD1 | -55.62 | -90.00 | -58.44 | -51.07 | -70.00 | -70.00 |
| ΔD2 | 10.59 | 27.19 | 7.51 | 10.13 | 20.03 | 14.94 |
| SKw | 14.44 | 21.06 | 15.86 | 13.47 | 13.85 | 10.02 |
| SKt | 29.66 | 64.12 | 31.81 | 39.32 | 57.50 | 62.23 |
| wβLN | 1.67 | 2.86 | 1.78 | 1.47 | 1.57 | 2.10 |
| tβLN | 2.17 | 2.67 | 2.11 | 2.32 | 2.61 | 2.79 |
| vd1Pave | 75.89 | 88.10 | 88.10 | 81.54 | 75.89 | 94.66 |
| (1) | 0.84 | 1.06 | 1.14 | 0.93 | 0.88 | 0.78 |
| (2) | 0.39 | 0.67 | 0.37 | 0.59 | 0.29 | 0.27 |
| (3) | 0.66 | 0.57 | 0.66 | 0.68 | 0.64 | 0.74 |
| (4) | -0.19 | -0.30 | -0.13 | -0.20 | -0.29 | -0.21 |
| (5) | 0.20 | 0.21 | 0.22 | 0.24 | 0.13 | 0.10 |
| (6) | 0.49 | 0.33 | 0.50 | 0.34 | 0.24 | 0.16 |
| (7) | 1.90 | 2.19 | 2.24 | 1.74 | 1.60 | 1.59 |

TABLE 1-continued

|  | Embodiment 1 | Embodiment 2 | Embodiment 3 | Embodiment 4 | Embodiment 5 | Embodiment 6 |
|---|---|---|---|---|---|---|
| (8) | 0.25 | 0.23 | 0.25 | 0.24 | 0.43 | 0.34 |
| (9) | 0.17 | 1.23 | 0.25 | 0.87 | 0.31 | 0.55 |
| (10) | 0.19 | 0.30 | 0.13 | 0.20 | 0.29 | 0.21 |
| (11) | 0.48 | 0.19 | 0.44 | 0.37 | 0.44 | 0.34 |
| (12) | 75.89 | 88.10 | 88.10 | 81.54 | 75.89 | 94.66 |

[Imaging Apparatus]

Figure 13:
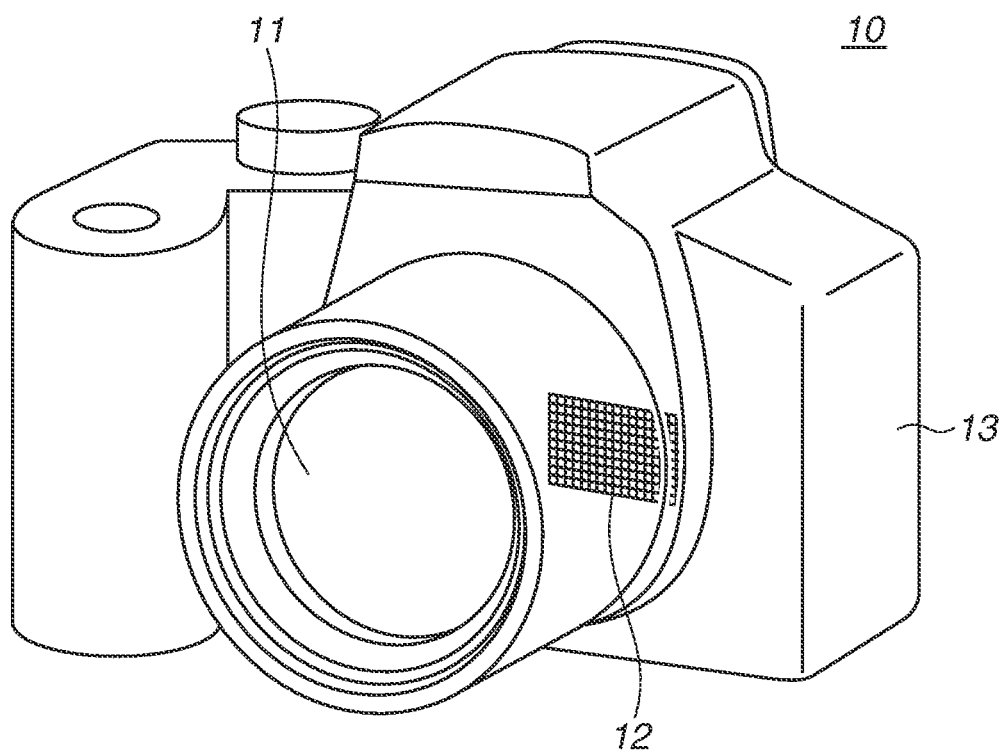
FIG. 13 is a schematic view of an image pickup apparatus.

Next, an embodiment of a digital still camera (image pickup apparatus) 10 using the zoom lens L0 according to any of the embodiments of the disclosure as an imaging optical system thereof will be described with reference to FIG. 13. In FIG. 13, the digital still camera 10 includes a camera main body 13 and an imaging optical system 11 formed of any of the zoom lenses L0 described in the first to sixth embodiments. A solid-state image sensor (photoelectric conversion element) 12 is, for example, a CCD sensor or a CMOS sensor built in the camera main body 13 and configured to receive an optical image formed by the imaging optical system 11 and to photoelectrically convert the optical image. The camera main body 13 may be a so-called single-lens reflex camera including a quick return mirror or may be a so-called mirrorless camera including no quick return mirror.

In this manner, an image pickup apparatus small in size yet advanced in optical performance can be acquired by applying any of the zoom lenses L0 according to the embodiments of the disclosure to an image pickup apparatus such as a digital still camera.

While the representative embodiments and examples of the disclosure have been described above, the disclosure is not limited to the embodiments and examples. The embodiments and examples can be combined, modified, and changed in various manners within the range of the spirit of the disclosure.

According to the disclosure, a zoom lens small in size and excellent in optical characteristic can be realized.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-180371, filed Sep. 30, 2019, which is hereby incorporated by reference herein in its entirety.

What is claimed is:

1. A zoom lens comprising in order from an object side to an image side:
a first lens unit having a positive refractive power;
a second lens unit having a negative refractive power;
a third lens unit having a positive refractive power;
an intermediate lens group including a plurality of lens units; and
a last lens unit having a negative refractive power and disposed closest to the image side,
wherein the zoom lens includes an aperture stop,
wherein an interval between the lens units adjacent to each other changes during zooming,
wherein the intermediate lens group includes a negative lens unit having a negative refractive power,
wherein both the negative lens unit and the last lens unit move to the object side during zooming from a wide-angle end to a telephoto end,
wherein a lens unit disposed adjacent to the negative lens unit on the object side has a positive refractive power, and
wherein the following conditional inequalities are satisfied:

$0.10 < fLN/f2 < 1.20$, $0.25 < ML3/MLN < 0.70$, $0.45 < DSPw/TDw < 0.95$, $-0.31 < \Delta2/\Delta D1 < -0.01$, and $0.22 < fLP/f1 < 0.70$, where fLN is a focal length of the negative lens unit, f2 is a focal length of the second lens unit, ML3 is a movement amount of the third lens unit during zooming from the wide-angle end to the telephoto end when focused at infinity, MLN is a movement amount of the negative lens unit during zooming from the wide-angle end to the telephoto end when focused at infinity, DSPw is a distance on an optical axis from the aperture stop to a lens surface of the zoom lens located closest to the image at the wide-angle end, TDw is a distance on the optical axis from a lens surface of the zoom lens located closest to the object to the lens surface of the zoom lens located closest to the image side at the wide-angle end, ΔD1 is a difference between (a) an interval on the optical axis between a lens surface of the first lens unit located closest to the image and a lens surface of the second lens unit located closest to the object at the wide-angle end and (b) an interval on the optical axis between the lens surface of the first lens unit located closest to the image and the lens surface of the second lens unit located closest to the object at the telephoto end, and ΔD2 is a difference between (a) an interval on the optical axis between a lens surface of the second lens unit located closest to the image and a lens surface of the third lens unit located closest to the object at the wide-angle end and (b) an interval on the optical axis between the lens surface of the second lens unit located closest to the image and the lens surface of the third lens unit located closest to the object at the telephoto end, fLP is a focal length of the lens unit disposed adjacent to the negative lens unit on the object side, and f1 is a focal length of the first lens unit.

2. The zoom lens according to claim 1, wherein the following conditional inequality is satisfied:

$0.05 < SKw/fw < 0.50$, where SKw is a backfocus of the zoom lens at the wide-angle end, and fw is a focal length of the zoom lens at the wide-angle end.

3. The zoom lens according to claim 1, wherein the following conditional inequality is satisfied:

$0.05 < SKw/SKt < 0.60$, where SKw is the backfocus of the zoom lens at the wide-angle end, and SKt is a backfocus of the zoom lens at the telephoto end.

4. The zoom lens according to claim 1, wherein the following conditional inequality is satisfied:

$$1.0 < LDw/fw < 3.5,$$

where LDw is a total optical length of the zoom lens at the wide-angle end, and fw is the focal length of the zoom lens at the wide-angle end.

5. The zoom lens according to claim 1, wherein the following conditional inequality is satisfied:

$$0.05 < fLN/fLR < 1.50,$$

where fLR is a focal length of the last lens unit.

6. The zoom lens according to claim 1, wherein the following conditional inequality is satisfied:

$$0 < |ML3/ML1| < 0.50,$$

where ML1 is a movement amount of the first lens unit during zooming from the wide-angle end to the telephoto end when focused at infinity.

7. The zoom lens according to claim 1, wherein the following conditional inequality is satisfied:

$$0.15 < (t\beta LN/w\beta LN)/(ft/fw) < 0.70,$$

where tβLN is a lateral magnification of the negative lens unit at the telephoto end, wβLN is a lateral magnification of the negative lens unit at the wide-angle end, fw is the focal length of the zoom lens at the wide-angle end, and ft is a focal length of the zoom lens at the telephoto end.

8. The zoom lens according to claim 1, wherein the following conditional inequality is satisfied:

$$65.00 < vd1Pave < 99.00,$$

where vd1Pave is an average value of Abbe numbers of positive lenses included in the first lens unit with respect to a d-line.

9. The zoom lens according to claim 1, wherein both the negative lens unit and the last lens unit each consist of three or less lenses.

10. The zoom lens according to claim 1, wherein the negative lens unit moves to the image side during focusing from infinity to a short distance.

11. The zoom lens according to claim 1, wherein the second lens unit does not move for zooming.

12. An image pickup apparatus comprising:
a zoom lens, and
an image sensor configured to photoelectrically convert an optical image formed by the zoom lens,
wherein the zoom lens comprises in order from an object side to an image side:
a first lens unit having a positive refractive power;
a second lens unit having a negative refractive power;
a third lens unit having a positive refractive power;
an intermediate lens group including a plurality of lens units; and
a last lens unit having a negative refractive power and disposed closest to the image side,
wherein the zoom lens includes an aperture stop,
wherein an interval between the lens units adjacent to each other changes during zooming,
wherein the intermediate lens group includes a negative lens unit having a negative refractive power,
wherein both the negative lens unit and the last lens unit move to the object side during zooming from a wide-angle end to a telephoto end, wherein a lens unit disposed adjacent to the negative lens unit on the object side has a positive refractive power, and wherein the following conditional inequalities are satisfied:

$$0.10 < fLN/f2 < 1.20,$$

$$0.25 < ML3/MLN < 0.70,$$

$$0.45 < DSPw/TDw < 0.95,$$

$$-0.31 < \Delta 2/\Delta D1 < -0.01, \text{ and}$$

$$0.22 < fLP/f1 < 1.70,$$

where fLN is a focal length of the negative lens unit, f2 is a focal length of the second lens unit, ML3 is a movement amount of the third lens unit during zooming from the wide-angle end to the telephoto end when focused at infinity, MLN is a movement amount of the negative lens unit during zooming from the wide-angle end to the telephoto end when focused at infinity, DSPw is a distance on an optical axis from the aperture stop to a lens surface of the zoom lens located closest to the image at the wide-angle end, and TDw is a distance on the optical axis from a lens surface of the zoom lens located closest to the object to the lens surface of the zoom lens located closest to the image side at the wide-angle end, ΔD1 is a difference between (a) an interval on the optical axis between a lens surface of the first lens unit located closest to the image and a lens surface of the second lens unit located closest to the object at the wide-angle end and (b) an interval on the optical axis between the lens surface of the first lens unit located closest to the image and the lens surface of the second lens unit located closest to the object at the telephoto end, and ΔD2 is a difference between (a) an interval on the optical axis between a lens surface of the second lens unit located closest to the image and a lens surface of the third lens unit located closest to the object at the wide-angle end and (b) an interval on the optical axis between the lens surface of the second lens unit located closest to the image and the lens surface of the third lens unit located closest to the object at the telephoto end, fLP is a focal length of the lens unit disposed adjacent to the negative lens unit on the object side, and f1 is a focal length of the first lens unit.

13. The zoom lens according to claim 1, wherein the first lens unit moves to the object side during zooming from the wide-angle end to the telephoto end.

14. The zoom lens according to claim 1, wherein the aperture stop is disposed in the object side of a lens disposed closest to the object side among lenses included in the intermediate lens group.

15. The zoom lens according to claim 1, wherein the second lens unit moves in a direction having a component perpendicular to the optical axis during an image blur correction.

16. The zoom lens according to claim 1, wherein the intermediate lens group consists of, in order from the object side to the image side, a fourth lens unit having a negative refractive power, a fifth lens unit having a positive refractive power, and a sixth lens unit having a negative refractive power, and wherein the negative lens unit is the sixth lens unit.

17. The zoom lens according to claim 1, wherein the intermediate lens group consists of, in order from the object side to the image side, a fourth lens unit having a negative refractive power, a fifth lens unit having a positive refractive power, a sixth lens unit having a negative refractive power, and a seventh lens unit having a positive refractive power, and wherein the negative lens unit is the sixth lens unit.

18. The zoom lens according to claim 1, wherein the intermediate lens group consists of, in order from the object side to the image side, a fourth lens unit having a negative refractive power, and a fifth lens unit having a positive refractive power, and wherein the negative lens unit is the fourth lens unit.

19. The zoom lens according to claim 1, wherein the intermediate lens group consists of, in order from the object side to the image side, a fourth lens unit having a positive refractive power, and a fifth lens unit having a negative refractive power, and wherein the negative lens unit is the fifth lens unit.

20. The zoom lens according to claim 1, wherein the intermediate lens group consists of, in order from the object side to the image side, a fourth lens unit having a positive refractive power, a fifth lens unit having a negative refractive power, and a sixth lens unit having a positive refractive power, and wherein the negative lens unit is the fifth lens unit.

21. The zoom lens according to claim 1, wherein the following conditional inequality is satisfied:

$$0.30 < fLN/f2 < 1.17.$$

22. The zoom lens according to claim 1, wherein the following conditional inequality is satisfied:

$$0.26 < ML3/MLN < 0.69.$$

23. The zoom lens according to claim 1, wherein the following conditional inequality is satisfied:

$$0.50 < DSPw/TDw < 0.90.$$

* * * * *